US007850260B2

(12) United States Patent
Figueroa et al.

(10) Patent No.: US 7,850,260 B2
(45) Date of Patent: Dec. 14, 2010

(54) INJECTION/EJECTION MECHANISM

(75) Inventors: Gilberto Figueroa, Modesto, CA (US);
Daniel Hruska, San Carlos, CA (US);
Hon Hung Yam, San Jose, CA (US);
Michael S. White, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 527 days.

(21) Appl. No.: 11/932,638

(22) Filed: Oct. 31, 2007

(65) Prior Publication Data
US 2008/0316718 A1 Dec. 25, 2008

Related U.S. Application Data

(60) Provisional application No. 60/945,778, filed on Jun. 22, 2007.

(51) Int. Cl.
*A47B 95/02* (2006.01)
(52) U.S. Cl. .................. 312/223.2; 312/333; 312/332.1
(58) Field of Classification Search ............. 312/223.2, 312/333, 332.1, 222; 292/251, 256.67, 256.71, 292/256.73, 293
See application file for complete search history.

(56) References Cited

U.S. PATENT DOCUMENTS

| | | | | |
|---|---|---|---|---|
| 3,435,777 A | * | 4/1969 | Schaaf ................. | 292/256.71 |
| 4,173,364 A | * | 11/1979 | Hein ...................... | 292/256.67 |
| 4,805,946 A | * | 2/1989 | Erwin et al. ................ | 292/251 |
| 5,584,410 A | * | 12/1996 | Siblik ......................... | 220/320 |
| 5,584,514 A | * | 12/1996 | Mascotte ...................... | 292/57 |
| 5,851,038 A | * | 12/1998 | Robinson et al. ........ | 292/256.67 |
| 6,502,869 B1 | * | 1/2003 | Rosenquist et al. ........... | 292/59 |
| 6,952,342 B1 | * | 10/2005 | Chen ..................... | 361/679.38 |
| 7,188,888 B2 | * | 3/2007 | Wheatley et al. ........ | 296/100.04 |
| 2004/0031767 A1 | * | 2/2004 | Ice .............................. | 211/26 |

* cited by examiner

*Primary Examiner*—Hanh V Tran
(74) *Attorney, Agent, or Firm*—Park, Vaughan, Fleming & Dowler LLP

(57) ABSTRACT

An injection/ejection mechanism is provided for mounting and dismounting of a unit in a chassis. The mechanism includes a drive screw that cooperates with a threaded barrel, the threaded barrel being rotatable for engagement and disengagement with at least one chassis component. The drive screw can be rotated in a first rotational direction to urge the threaded barrel in a first longitudinal direction against at least one chassis component for mounting of the unit and can be rotated in an opposite rotational direction to urge the threaded barrel in an opposite longitudinal direction against at least one chassis component for dismounting of the unit.

17 Claims, 22 Drawing Sheets

FIG. 1

INJECTION/EJECTION MECHANISM

RELATED APPLICATION

This application hereby claims priority under 35 U.S.C. §119 to U.S. Provisional Patent Application No. 60/945,778 filed 22 Jun. 2007, entitled "Communication Systems," by inventors Bjorn D. Johnsen, Ola Torudbakken, Inge Birkeli, Andreas Bechtolsheim, Hans Opheim, Gilberto Figuroa, Daniel Hruska, Hon Hung T Yam, and Michels S. White.

BACKGROUND

The invention relates to an injection/ejection mechanism for use, for example, with components of a communication systems, for example to switch system.

In a complex electronics system, for example a communications system such as a switch, various components can be provided on field replaceable units that can be inserted into and removed from a chassis for maintenance. Such steps are often referred to as the injection and ejection of a field replaceable unit.

Especially in a large system that includes a significant number of electrical and/or mechanism connections, a considerable force may need to be applied to insert and remove the field replaceable units. It is desirable, therefore, to provide an injection/ejection mechanism that can enable a user readily to inject and/or eject a filed replaceable unit in manner that does not potentially cause harm or damage to the field replaceable unit.

An embodiment of the present invention seeks at least to mitigate some of these concerns.

SUMMARY

Various invention aspects are set out in the accompanying claims. Other invention aspects are described herein. The invention aspects have been made, at least in part, in consideration of problems and drawbacks of conventional systems.

An example embodiment of the invention can provide an injection/ejection mechanism for mounting and dismounting of a unit in a chassis. The mechanism can include a drive screw that cooperates with a threaded barrel, the threaded barrel being rotatable for engagement and disengagement with at least one chassis component. The drive screw can be rotatable in a first rotational direction to urge the threaded barrel in a first longitudinal direction against at least one said chassis component for mounting of the unit and can being rotatable in an opposite rotational direction to urge the threaded barrel in an opposite longitudinal direction against at least one said chassis component for dismounting of the unit.

A chassis can include at least one location for receiving a field replaceable unit, wherein each said location comprising at least one said chassis component.

In one example embodiment, an injection/ejection mechanism can enable insertion and ejection of a switch card onto a midplane that exhibits an excess of 800 plus pounds of insertion force.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Specific embodiments are described by way of example only with reference to the accompanying drawings in which:

FIG. 1 is a schematic representation of the rear of an example switch chassis;

Figure 2:
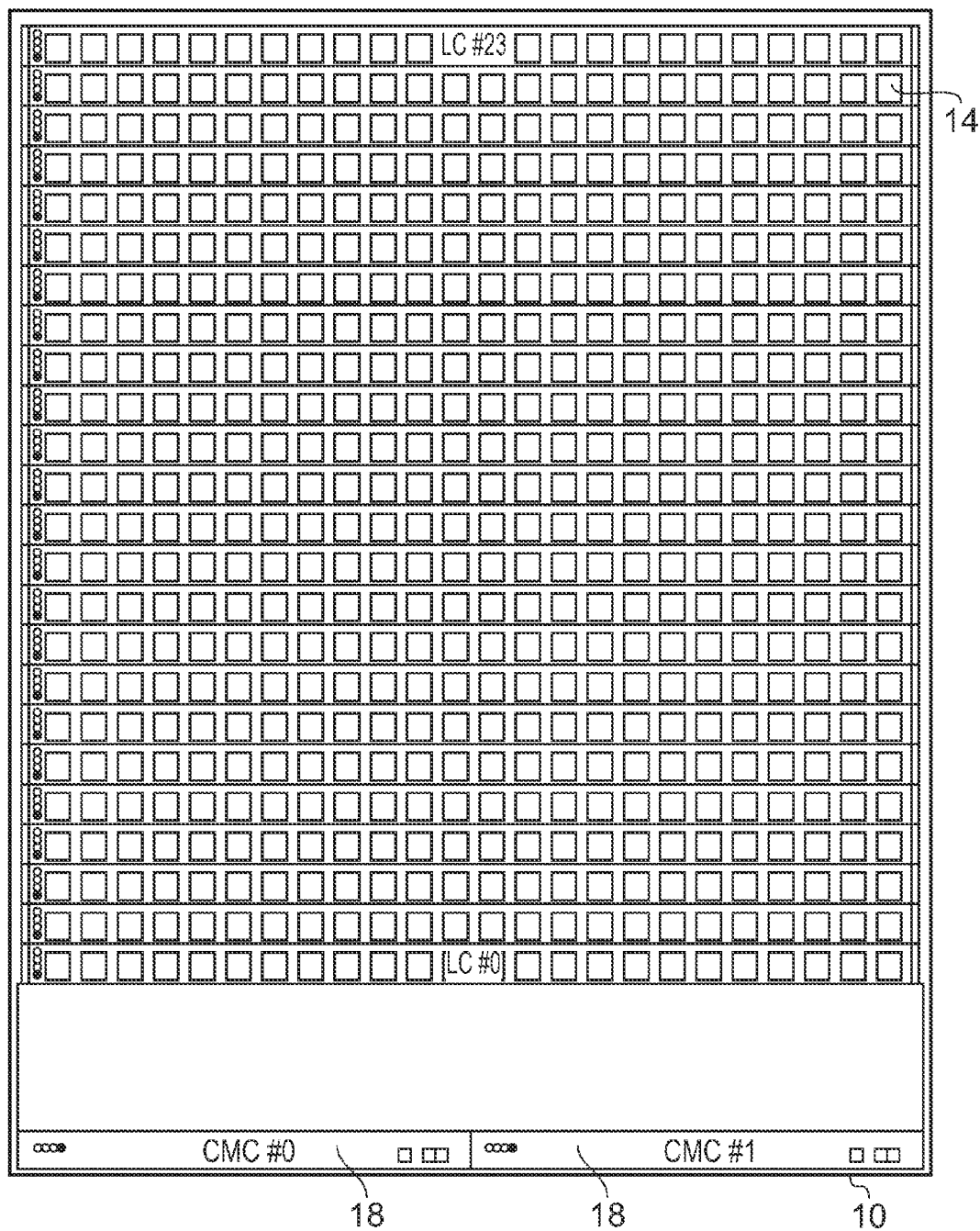
FIG. 2 is a schematic representation of the front of the example switch chassis.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention.

DETAILED DESCRIPTION

An example embodiment of a 3456-port InfiniBand 4x DDR switch in a custom rack chassis is described, with the switch architecture being based upon a 5-stage CLOS fabric. The rack chassis can form a switch enclosure.

The CLOS network, first described by Charles Clos in 1954, is a multi-stage fabric built from smaller individual switch elements that provides full-bisectional bandwidth for all end points, assuming effective dispersive routing.

Given that an external connection (copper or fiber) costs several times more per port than the silicon cost, the key to make large CLOS networks practical is to minimize the number of external cables required and to maximize the number of internal interconnections. This reduces the cost and increases the reliability. For example, a 5-stage fabric constructed with switching elements of size (n) ports supports (n*n/2*n/2) edge points, using (5*n/2*n/2) switch elements with a total of (3*n*n/2*n/2) connections. The ratio of total to external connections is 5:1, i.e. 80% of all connections can be kept internal. The switch elements (switch chips) in the described example can be implemented using a device with 24 4x DDR ports.

An example switch uses a connector that support 3 4x ports per connector, which can further to minimize a number of cables needed. This can provides a further 3:1 reduction in the number of cables. In a described example, only 1152 cables (⅓*n*n/2*n/2) are required.

In contrast if prior commercially available 288-port switches and 24-port switches were used to create a 3456-port fabric a total of 6912 cables (2*n*n/2*n/2) would be required.

The example switch can provide a single chassis that can implement a 5-stage CLOS fabric with 3456 4x DDR ports. High density external interfaces can be provided, including fiber, shielded copper, fiber and twisted pair copper. The amount of cabling can be reduced by 84.4% when compared to building a 3456-port fabric with commercially available 24-port and 288-port switches. In the example embodiment, an orthogonal midplane design can be provided that is capable of DDR data rates.

An example switch can address a full range of HPC cluster computing from a few hundred to many thousand of nodes with a reliable and cost-effective solution that uses fewer chassis and cables than prior solutions.

Figure 1:
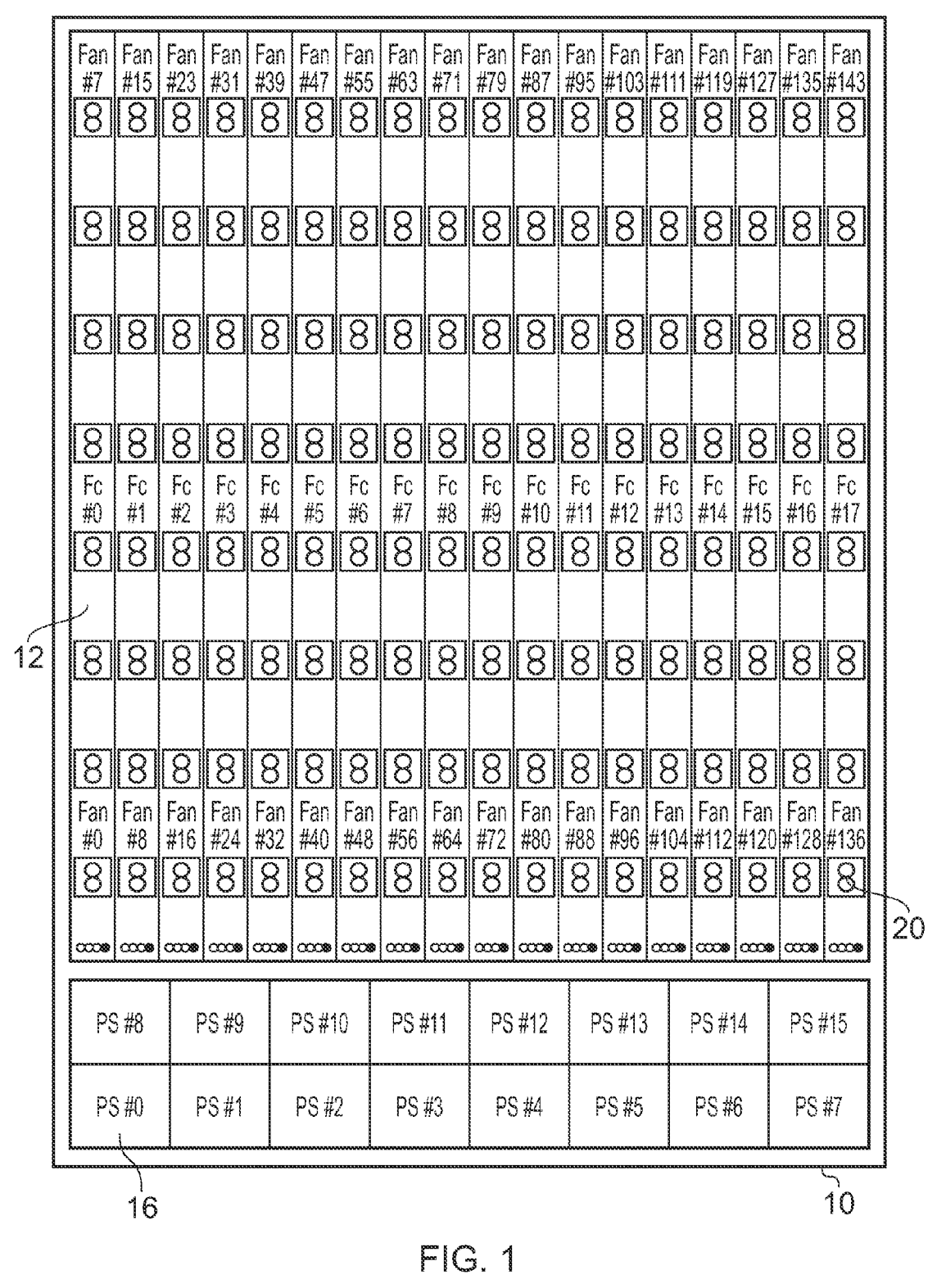

FIGS. 1 and 2 are schematic diagrams of an example of a switch chassis as viewed from the rear (FIG. 1) and front (FIG. 2), respectively. This example comprises a custom rack chassis 10 that is 60" high, 47" wide, and 36" deep, not including a cable management system. The example embodiment provides a passive orthogonal midplane design (not shown in FIGS. 1 and 2) that provides a direct interface between Line Cards (LC) 12 and Fabric Cards (FC) 14. The line cards provide connections to external lines and the fabric card form switch fabric cards for providing switching functions.

In the present example, up to 18 fabric cards (FC0 to FC17) 12, FIG. 1 are provided. Each fabric card 12 plugs vertically into the midplane from the rear.

In the present example, up to 24 line cards (LC0 to LC23) 14, FIG. 2 can be provided. Each line card provides 144 4x ports (24 stacked 168-circuit cable connectors). Each line card plugs horizontally into the midplane from the front.

Up to 16 hot-pluggable power supply units (PS0-PS16) 16, FIG. 1 are each plugged into the chassis 10 from the rear. Each power supply unit 16 has an alternating current (AC) power supply inlet (not shown). The power supply units 16 plug into a power distribution board (PDB), which is not shown in FIGS. 1 and 2. Two busbars (not shown in FIGS. 1 and 2), one per group of 8 power supply units, distribute direct current (DC) supply to the line cards 12 and the fabric cards 14.

Two hot-pluggable Chassis Management Controllers (CMCs) 18, FIG. 2 plug into the power distribution board from the front. Each chassis management controller 18 comprises a mezzanine card.

The power distribution board is a passive power distribution board that supports up to 16 power supply units DC connectors and 2 chassis management controller slot connectors. The power distribution board connects to the midplane through ribbon cables that carry low-speed signals.

In the present example, up to 144 fan modules (Fan#0-Fan#143) 20 are provided, with 8 fan modules per fabric card 12 in the present instance. Cooling airflow in controlled to be from the front to the rear, using redundant fans on the fabric cards to pull the air from the line cards 14 through openings (not shown in FIGS. 1 and 2), in the midplane. The power supply units 16 have their own fans for cooling with the air exiting through the rear of the chassis. The power supply units 18 are also used to cool the chassis management controllers 18.

Figure 3:
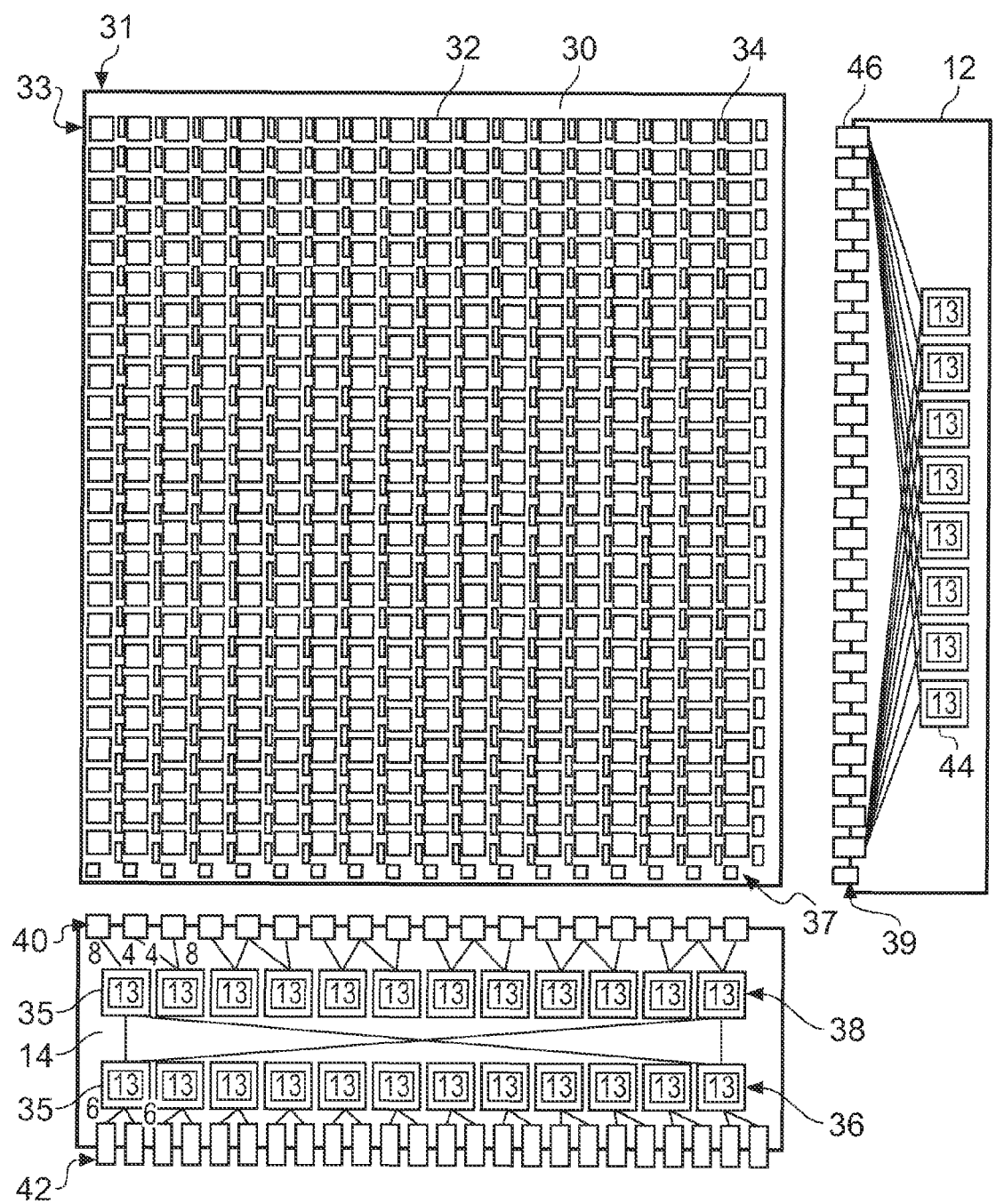
FIG. 3 is a schematic representation of a midplane illustrating the logical connectivity through the midplane between cards at the rear and cards at the front orientated orthogonally with respect to each other.

FIG. 3 is a schematic representation of a printed circuit board 30, which is configured as a midplane 30 in the switch chassis 10. The midplane 30 is configured in an orthogonal manner such that each fabric card 12 can connect to each of the line cards 14 without requiring any signal traces on the midplane 30. The orthogonal midplane design can provide excellent signal integrity in excess of 10 Gbps per differential pair.

The midplane 30 is represented schematically to show an array of midplane connector pairs 32 as black squares with ventilation openings shown as white rectangles. Each midplane connector pair 32 comprises a pair of connectors (to be explained in more detail later) with one connector on a first face of the midplane and a second connector on the other face of the midplane, the first and second connectors being electrically interconnected by way of pass-through vias (not shown in FIG. 3) formed in the midplane 30. As will be explained later, the first and second connectors of a midplane connector pair 32 are each multipath connectors. They are arranged orthogonally with respect to one another such that a first midplane connector of a midplane connector pair 32 is connectable to a fabric card 12 on a first side of the plane 30 in a first orientation and a second midplane connector of the midplane connector pair 32 is connectable to a line card on a second side of the plane 30 in a second orientation substantially orthogonally to the first orientation.

In an example described herein, each of the first connectors of the respective midplane connector pairs 32 of a column 31 of midplane connector pairs 32 can be connected to one fabric card 12. This can be repeated column by column for successive fabric cards 12. In an example described herein, each of the second connectors of the respective midplane connector pairs 32 of a row 33 of midplane connector pairs 32 can be connected to one line card 14. This can be repeated row by row for successive line cards 14. As a result, the midplane can be populated by vertically oriented fabric cards 12 on the first side of the midplane and horizontally orientated line cards 12 on the second side of the midplane 30.

In the present example the midplane 30 provides orthogonal connectivity between fabric cards 12 and the line cards 14 using orthogonal connector pairs. Each orthogonal connector pair provides 64 differential signal pairs, which is sufficient to carry the high-speed signals needed as well as a number of low-speed signals. The orthogonal connector pairs are not shown in FIG. 3, but are described later.

The midplane 30 is also configured to provide 3.3 VDC standby power distribution to all cards and to provide I2C/System Management Bus connections for all fabric cards 12 and line cards 14.

Another function of the midplane 30 is to provide thermal openings for a front-to-rear airflow. The white holes in FIG. 3 (e.g., hole 34) form openings 34 in the midplane for airflow. In this example the midplane is approximately 50% open for airflow.

The fabric cards 12 each support 24 connectors and the line cards 14 each support 18 connectors.

FIG. 3 also illustrates an example of how the fabric cards 12, the midplane 20 and the line cards 14 interconnect. In this example there are 24 switch chips on a line card 14 and 8 chips on each of the 18 fabric cards 12.

As previously mentioned a 5-stage Clos fabric has a size $n*n/2*n/2$ in which n is the size of the switch element. The example switch element in FIG. 3 has n equal to 24 ports. Each line card 14 has 24 chips in 2 rows with 12 chips in each row. Each of 12 ports of each switch chip 35 in a first row 36 of the line card 14 is connected to 2 cable connectors 42, with 6 ports per cable connector. There are a total of 24 cable connectors per line card 14. Each cable connector can accommodate two physical independent cables that each carries 3 ports (links). Each cable connector 42 can accommodate 6 ports. The remaining 12 ports of each switch chip 35 in the first row 26 is connected to one chip 35 each in a second row 38 of chips 35.

There are 18 midplane connectors 32 per line card 14. Each midplane connector 32 provides one physical connection to one fabric card 14. Each midplane connector 32 can accommodate 8 4x links (there are 8 differential pairs per 4x link and a total of 64 differential pairs provided by the orthogonal connector)

12 ports of each of the switch chips 35 in the second row 38 of the line card 14 are connected to 2 line card connectors 40 that are used to connect the line card 14 to the midplane connectors 32 and thereby with the fabric cards 12 through the orthogonally oriented midplane connector pair. Of the 12 ports per switch chip 35, eight ports are connected to one line card connector 40, and the remaining four ports are connected to another line card connector 40 as represented by the numbers 8 and 4 adjacent the two left hand switch chips 35 in the second row 38. 2 switch chips are thereby connected to a group of 3 line card connectors 40 and hence to a group of three midplane connectors pairs 32.

The remaining 12 ports of each switch chip 35 in the second row 38 of the line card 14 are connected to each of the 12 switch chips 35 in the first row 36 of the line card 14.

At the fabric card 12 all links through an orthogonally oriented midplane connector pair 32 are connected to one line card 14. A single orthogonal connector 46 carries 8 links. These links are connected to one switch element 44 each at the fabric card 12.

Also shown in FIG. 3 are power connectors 37 on the midplane and power connectors 39 on the fabric cards 12.

There has been described a system with 24 line cards with 144 ports each, realized through 48 physical cable connectors that each carry 3 links. The switch fabric structure of each line card 14 is fully connected, so the line card 14 itself can be viewed upon as a fully non-blocking 144 port switch. In addition each line card 14 has 144 links that are connected to 18 fabric cards. The 18 fabric cards then connect all the line cards 14 together in a 5-stage non-blocking Clos topology.

Figure 4A:
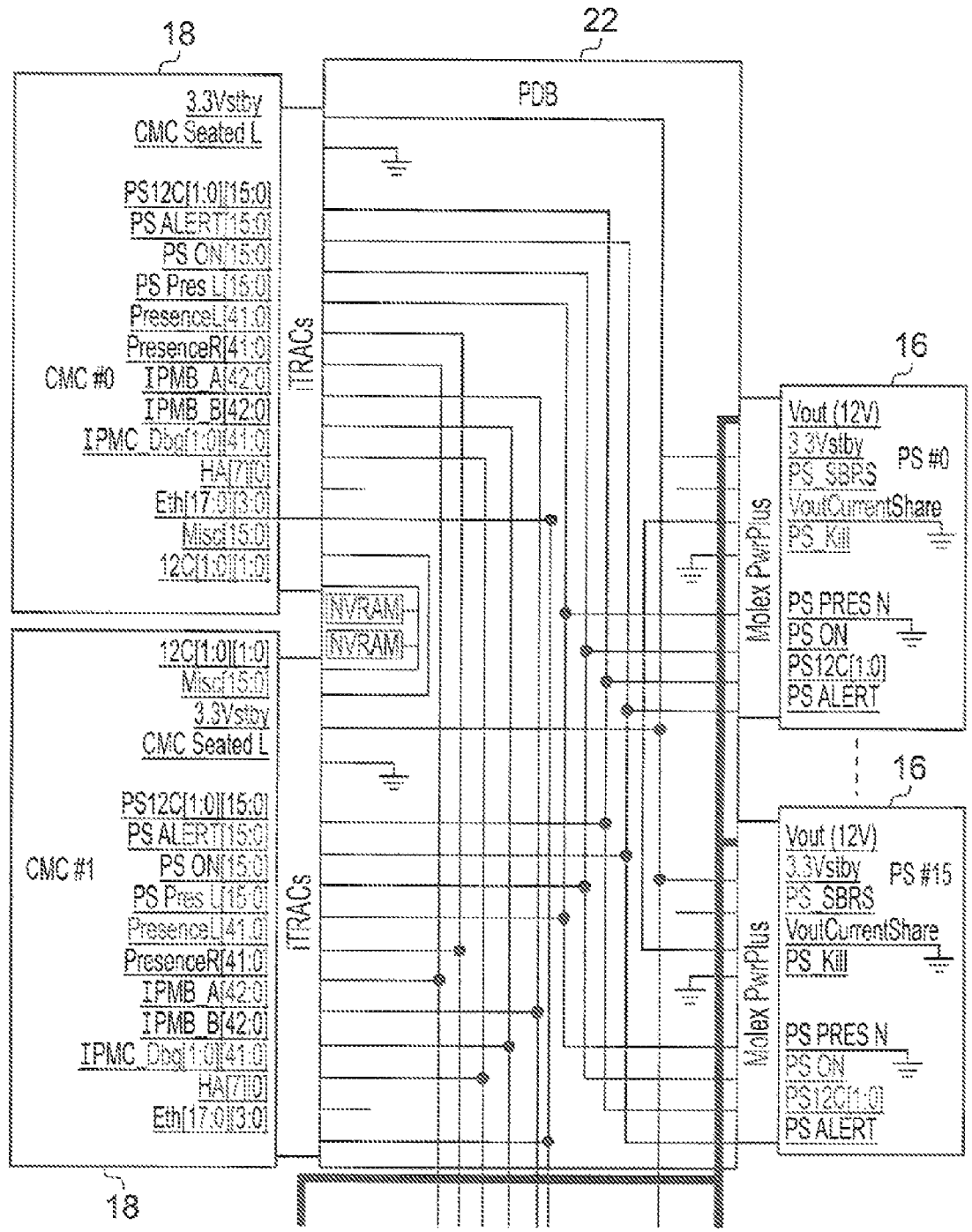
FIG. 4A is a schematic diagram of an example management infrastructure.
Figure 4B:
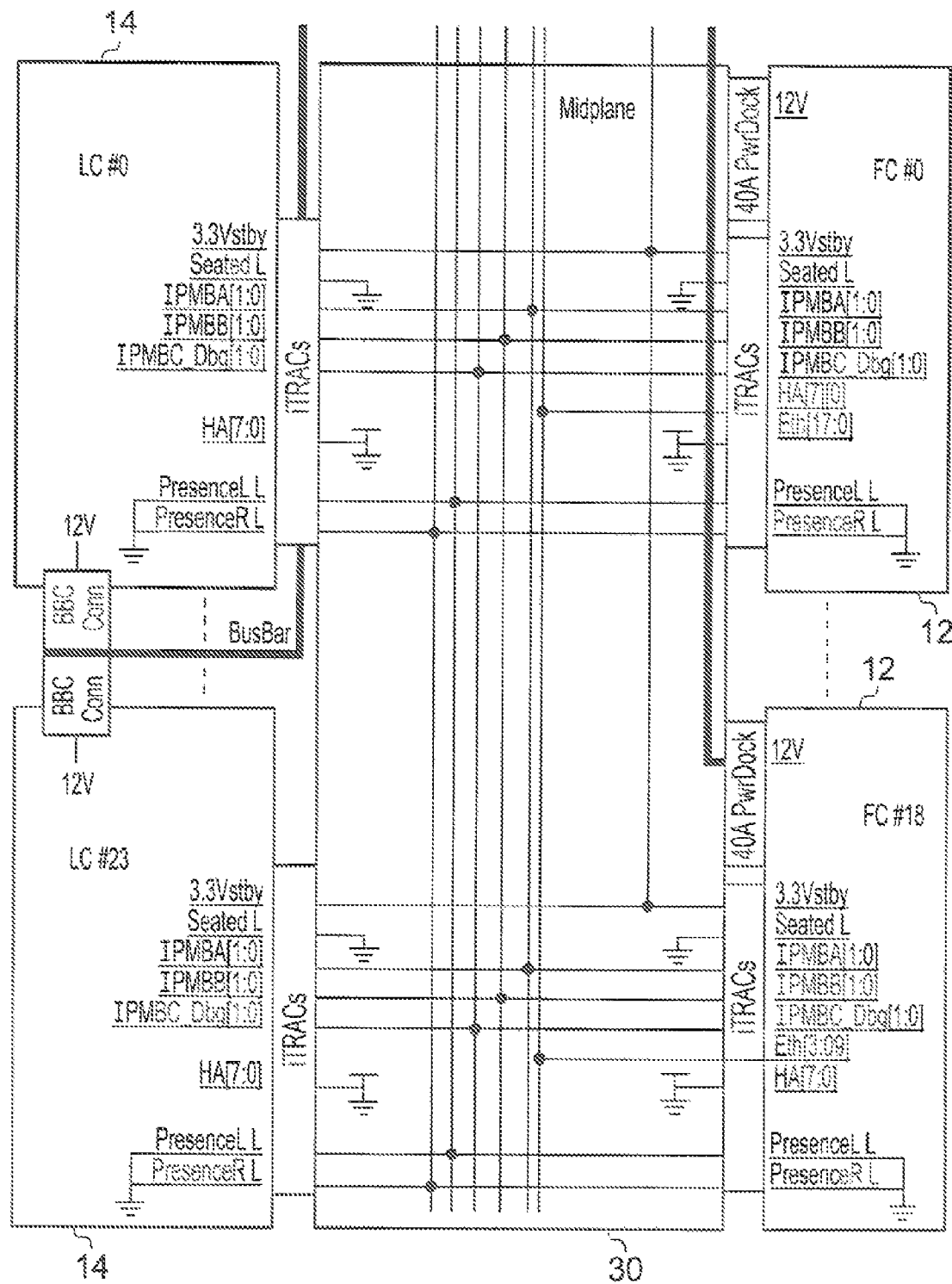
FIG. 4B continues the schematic diagram illustrated in FIG. 4A.

FIGS. 4A and 4B are schematic diagrams of an example management infrastructure. This example provides redundant chassis management controllers 18. In addition each fabric card 12 and line card 14 supports a management controller. There are redundant management connections from each chassis management controller 18 to each of the fabric card and line card management controllers. In addition there are I2C connections to each of the power supply units 16. The management connections pass between the fabric cards 12, the line cards 14, the power supply units 16 and the chassis management cards 18 via the midplane and the power distribution board 22 in the present example.

FIGS. 5 to 11 provide various schematic views of an example of a switch chassis in accordance with the invention.

Figure 5:
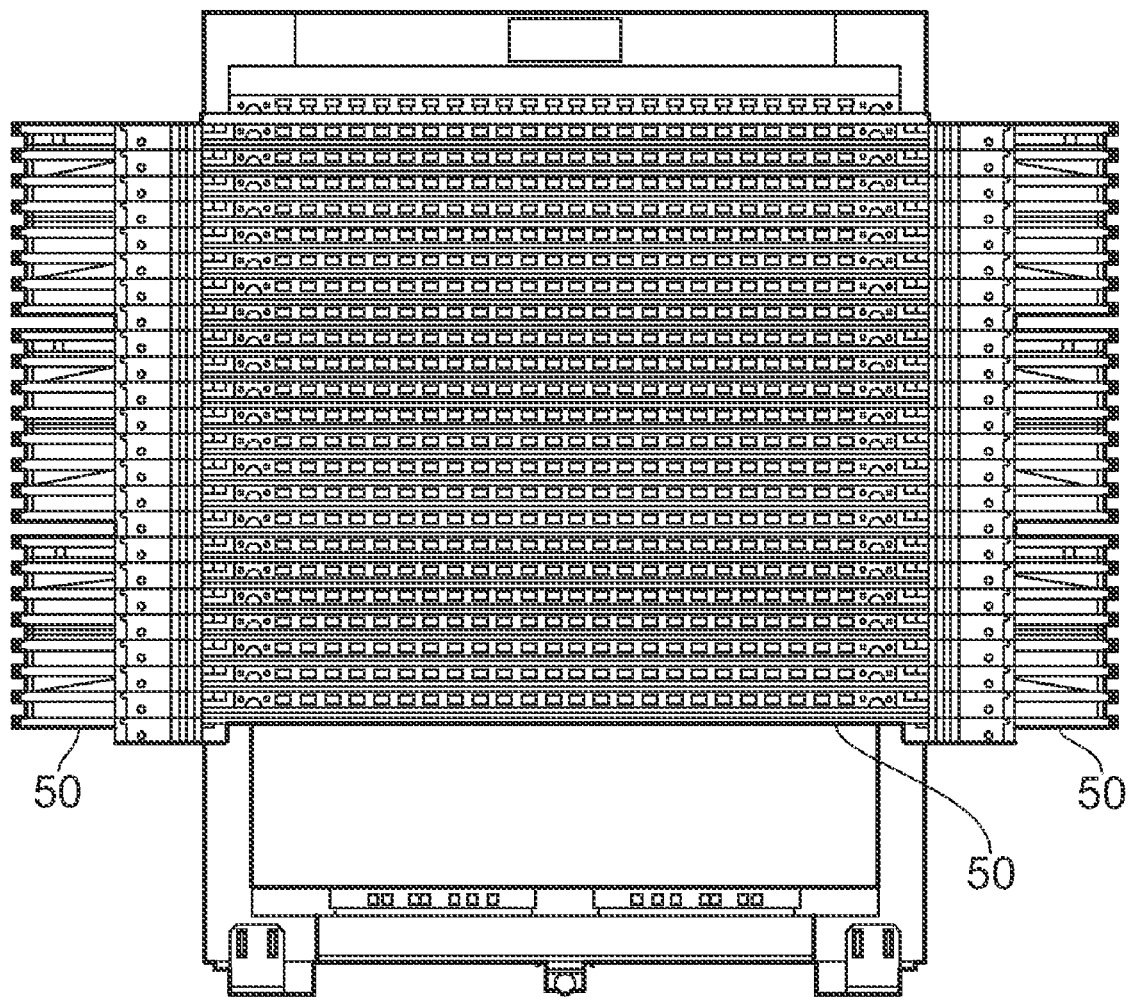
FIGS. 5 to 11 are views of an example of a switch chassis.
Figure 6:
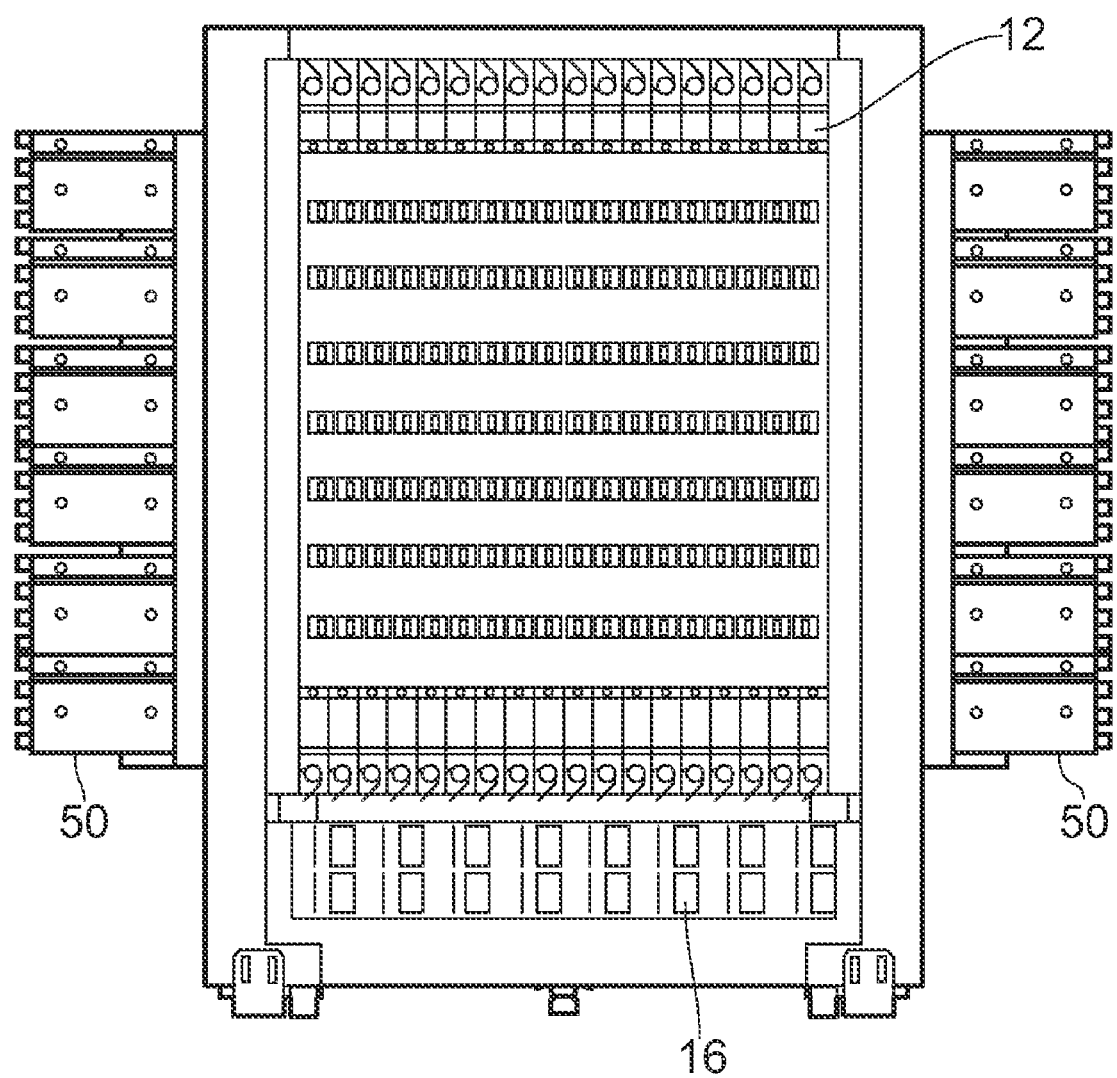
Figure 7:
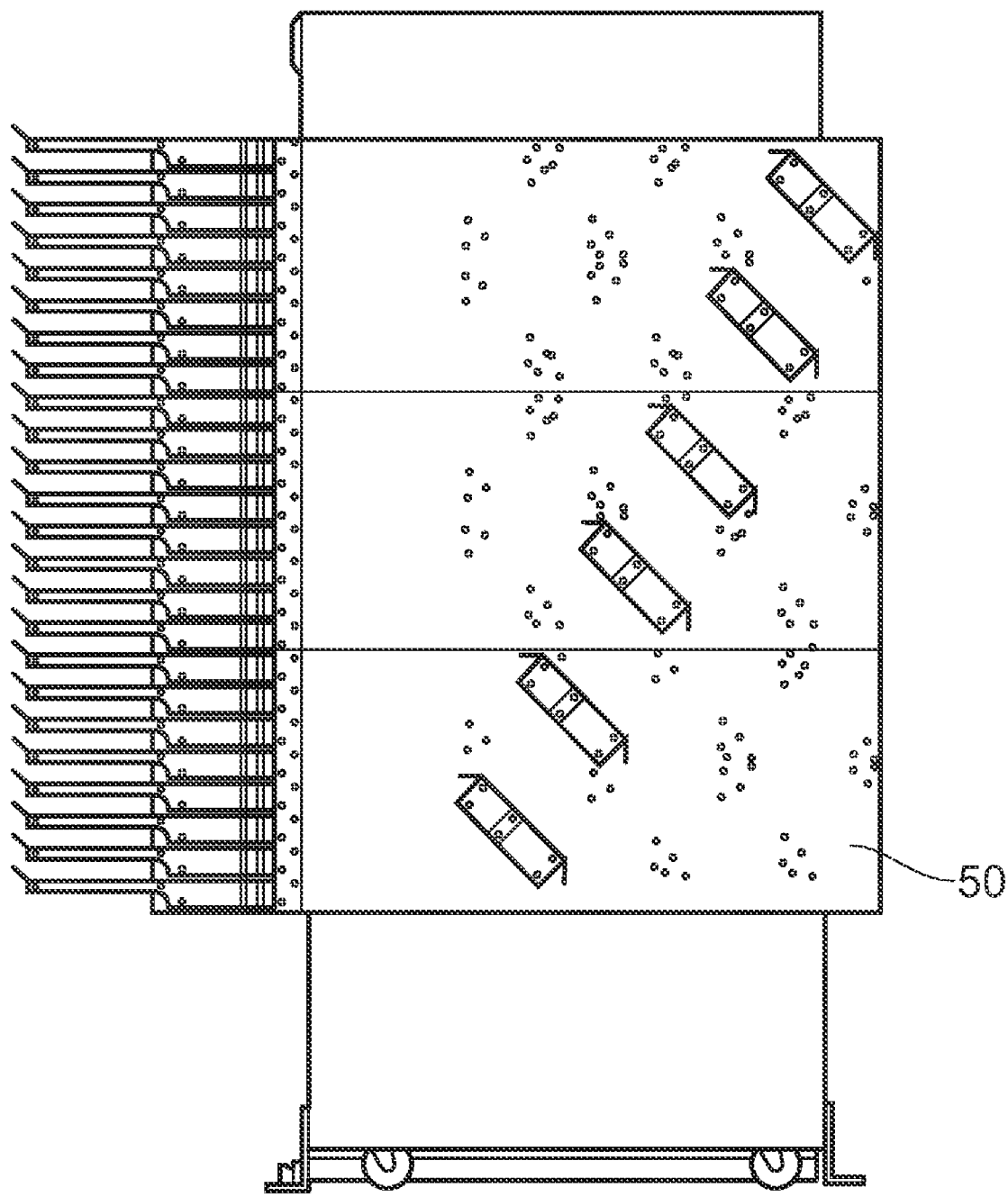
Figure 8:
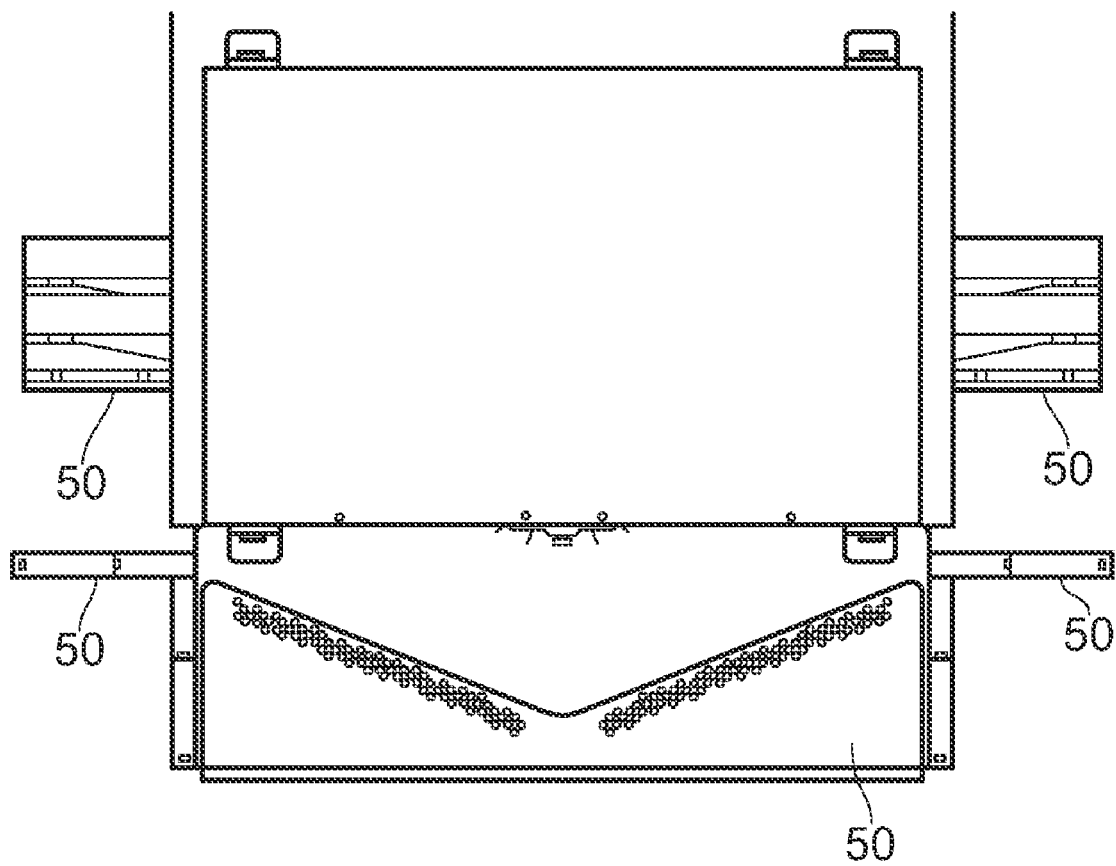
Figure 9:
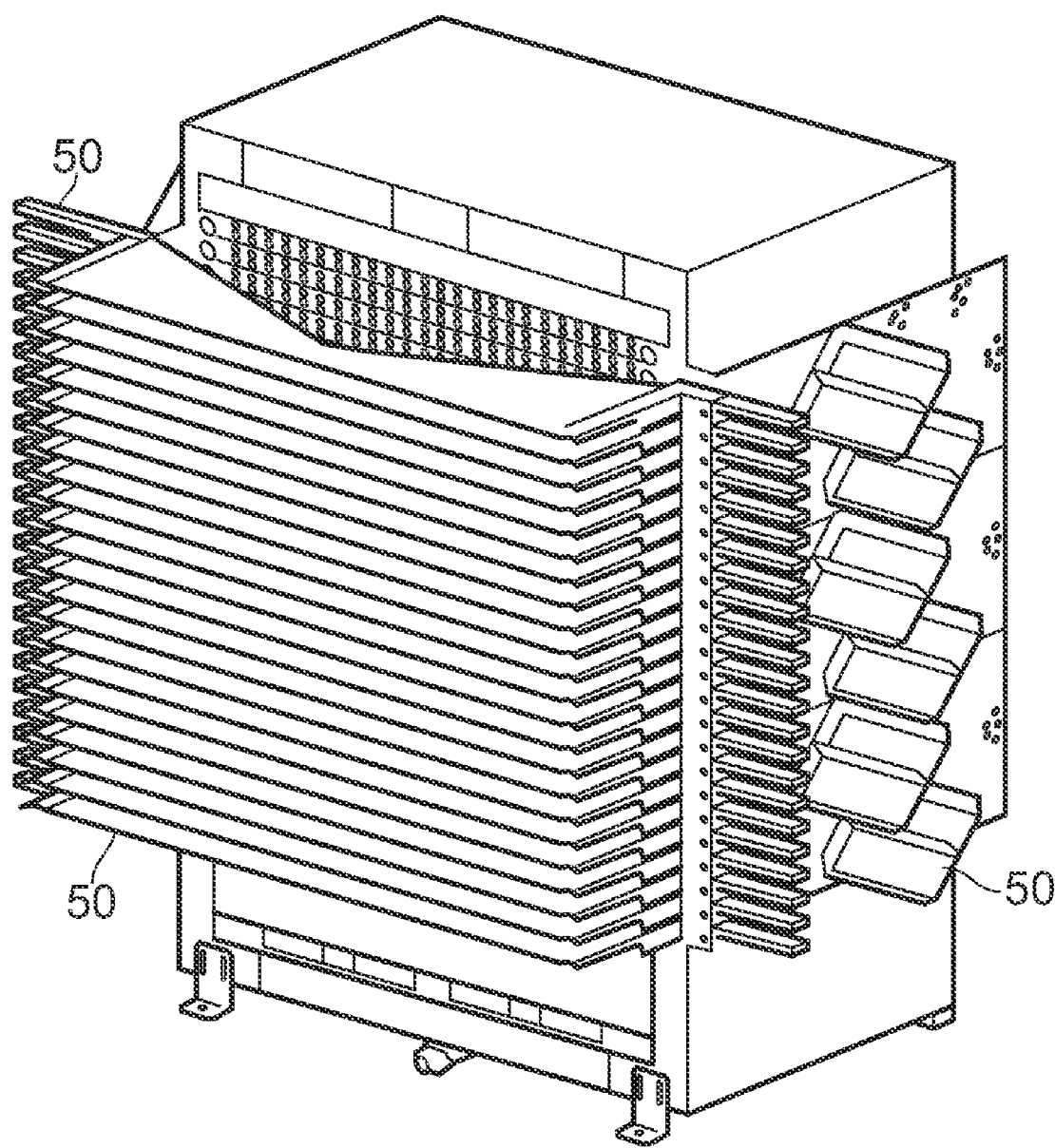
Figure 10:
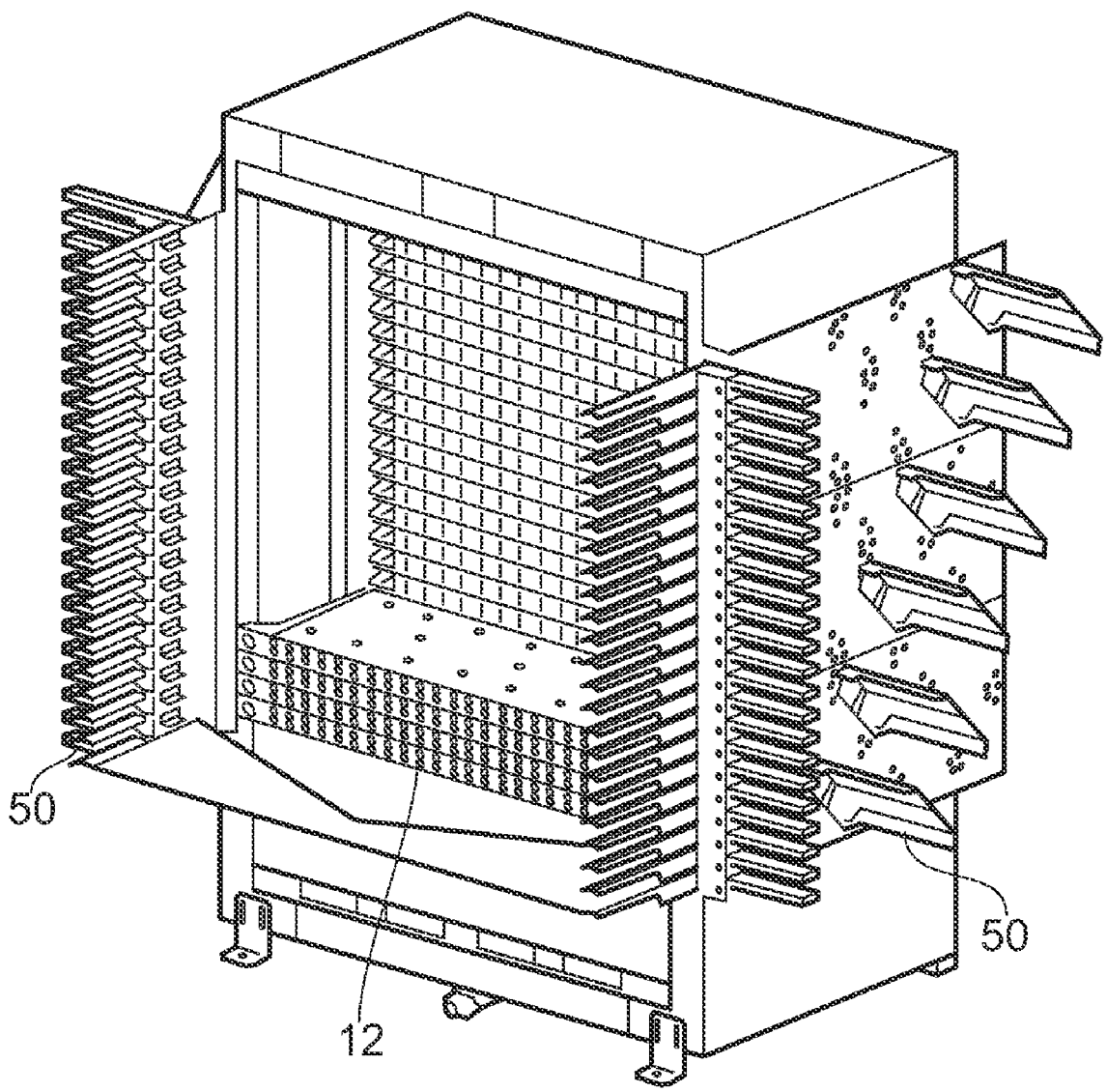
Figure 11:
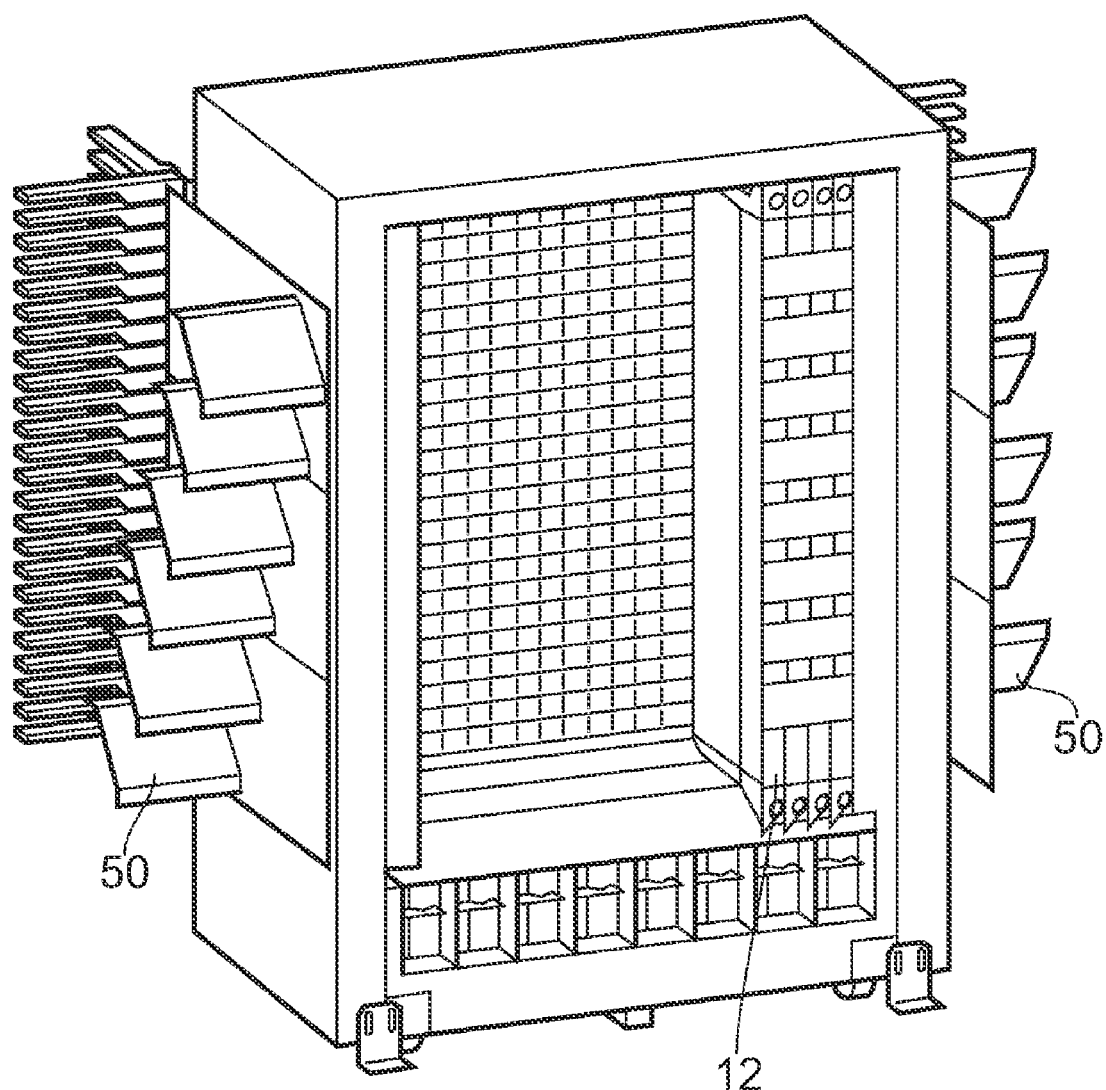

FIG. 5 is a front view of the switch chassis 10 showing cable management structures 50. FIG. 6 is a rear view of the switch chassis 10 showing the fabric cards 12, the power supply units 16 and cable management structures 50. FIG. 6 is a side view of the switch chassis 10 further showing the cable management structures 50. FIG. 8 is a side view of the switch chassis 10 further showing the cable management structures 50. FIG. 9 is an isometric view of the switch chassis 10 from the line card 14 (front) side further showing the cable management structures 50. FIG. 10 is an isometric view of the switch chassis 10 from the line card 14 (front) side showing four line cards 12 installed horizontally in the chassis 10 and part of the cable management structures 50. FIG. 11 is an isometric view of the switch chassis 10 from the fabric card 12 (rear) side showing four fabric cards 12 installed vertically in the chassis 10 and part of the cable management structures 50.

Figure 12:
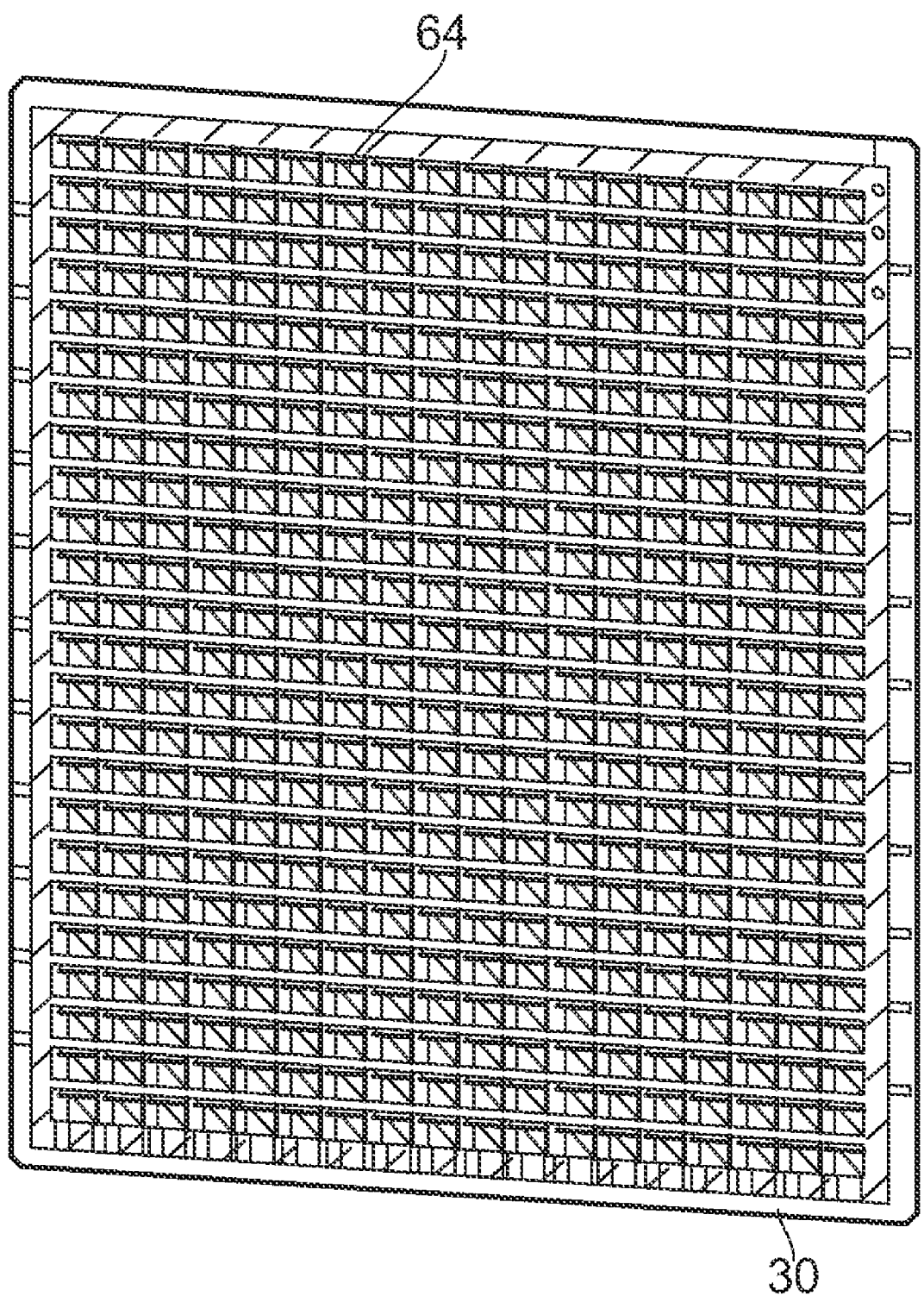
FIG. 12 is a first isometric view of an example of a midplane.
Figure 13:
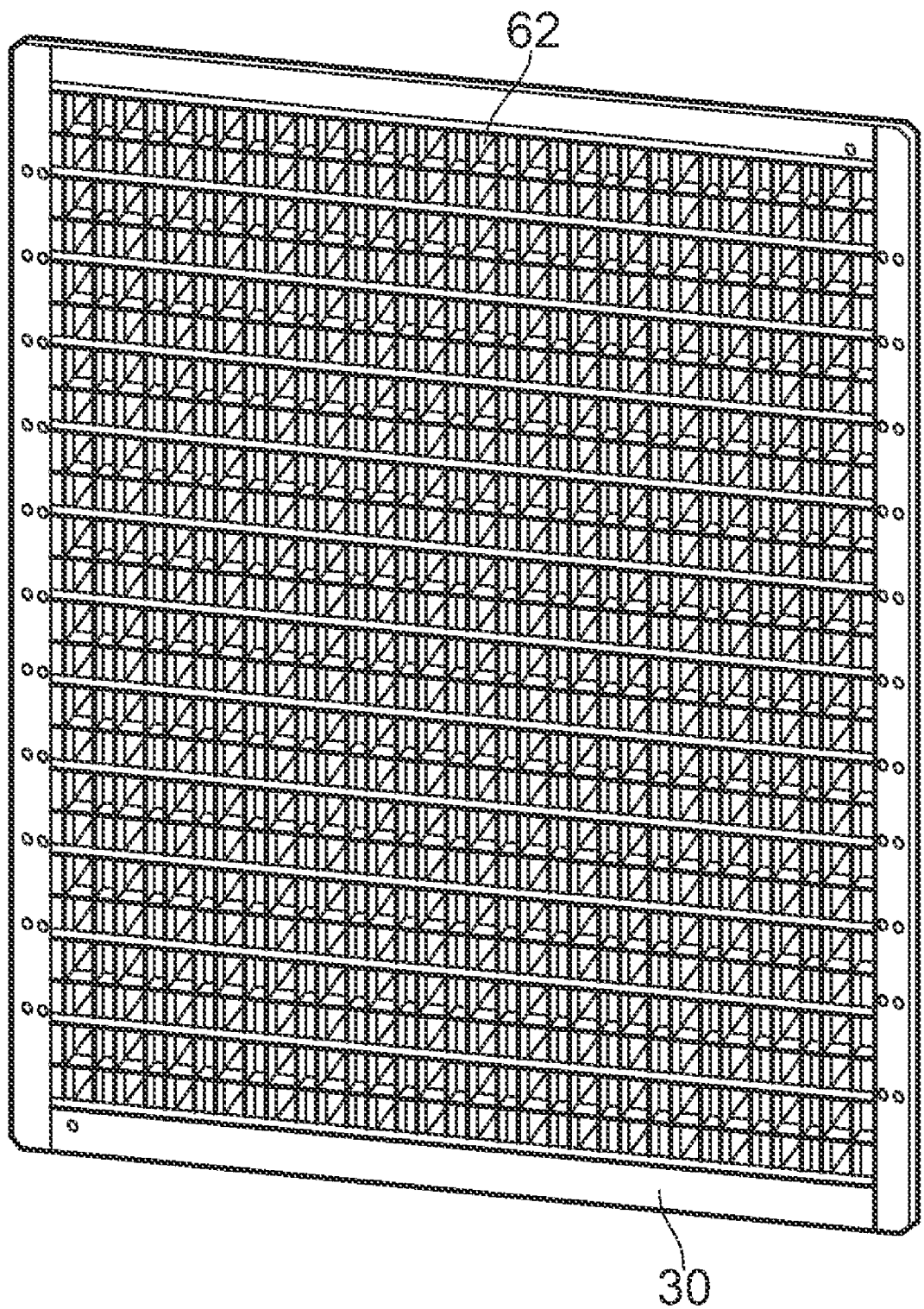
FIG. 13 is a further isometric view of an example of a midplane.

FIGS. 12 and 13 provide various schematic views of an example of a midplane 30 in accordance with the invention. FIG. 12 is an isometric view of the midplane 30 from the line card 14 (front) side and FIG. 13 is an isometric view of the midplane 30 from the fabric card 12 (rear) side. FIG. 12 shows the array formed from rows and columns of the second connectors 64 of the midplane connectors pairs 32 described with reference to FIG. 3. FIG. 13 shows the array formed from rows and columns of the first connectors 62 of the midplane connectors pairs 32 described with reference to FIG. 3.

Figure 14:
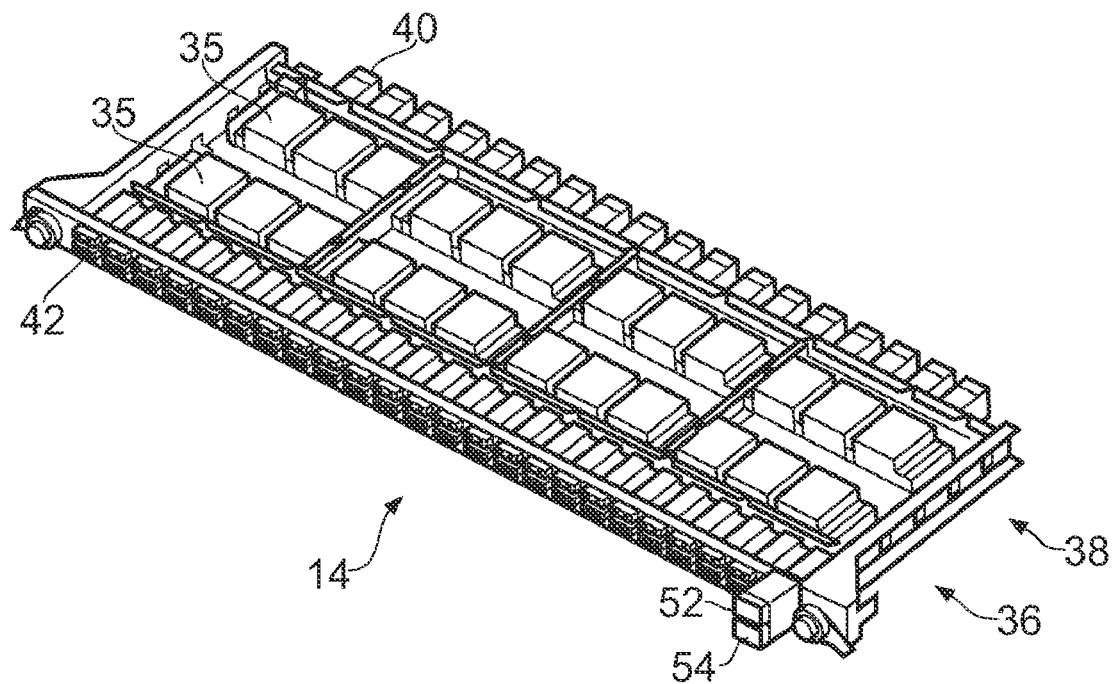
FIG. 14 is an isometric view of an example of a line card.

FIG. 14 is an isometric view of an example of a line card 14. This shows the first and second rows 36 and 38 of switch chips 35, the line board connectors 40 and the cable connectors 42. As can be seen in FIG. 14, the cable connectors 42 are stacked double connectors such each cable connector can connect to two cables 52 and 54.

Figure 15:
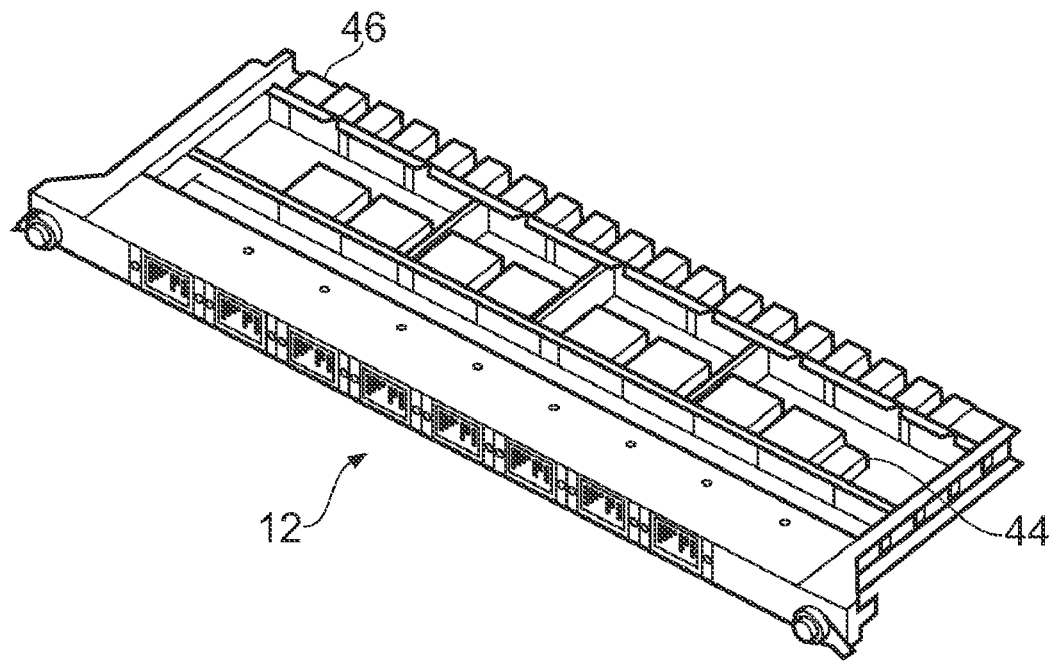
FIG. 15 is an isometric view of an example of a fabric card.

FIG. 15 is an isometric view of an example of a fabric card 12. This shows the fabric card connectors 46 and the switch elements 44.

Figure 16:
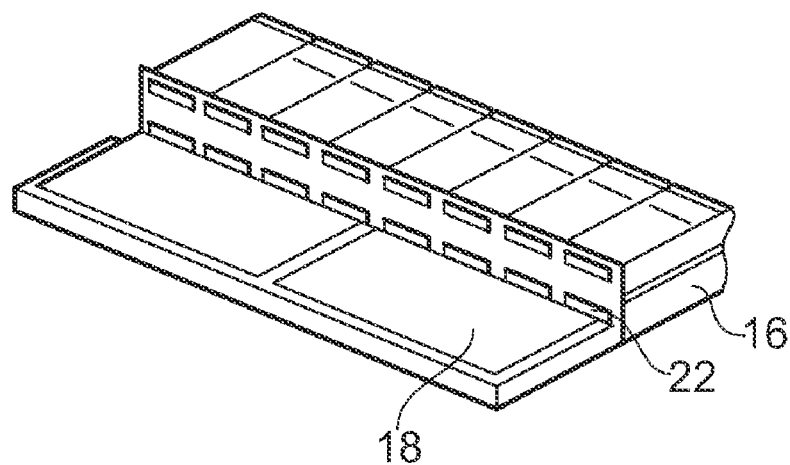
FIG. 16 is schematic representations of part of a switch chassis.
Figure 17:
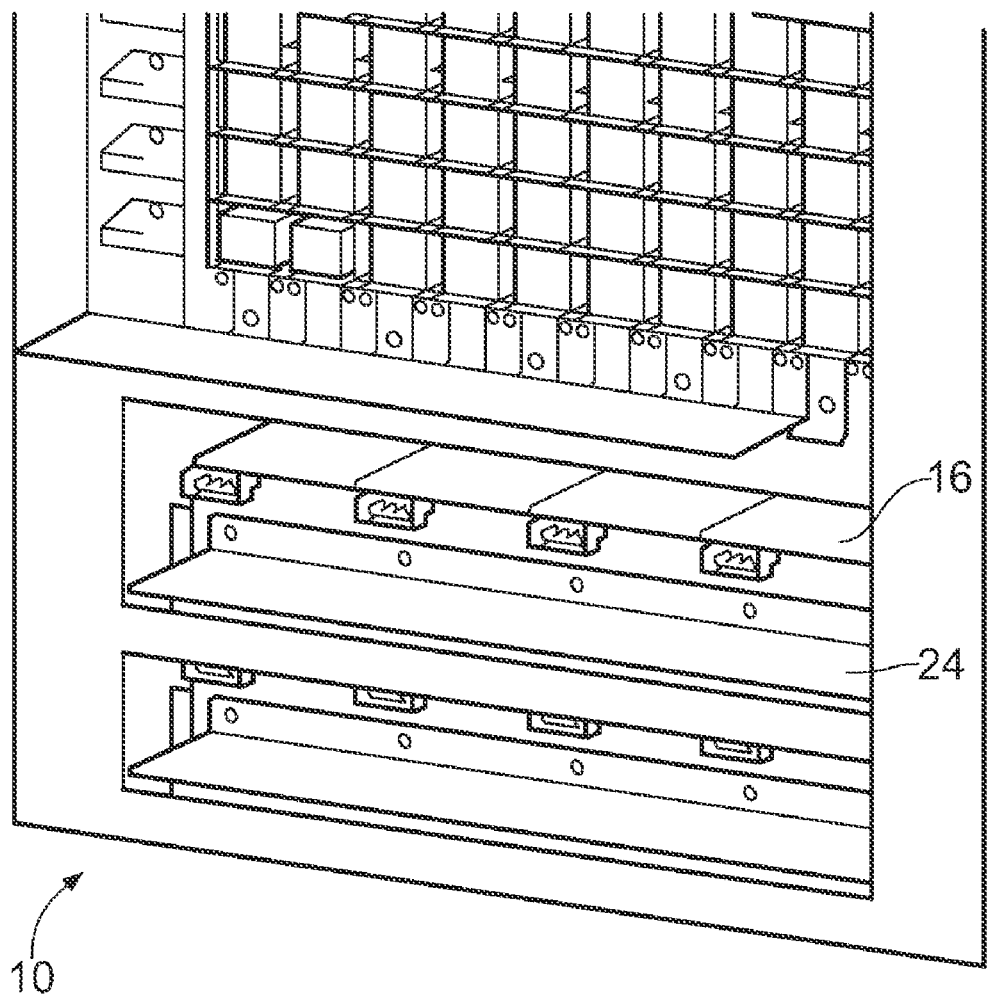
FIG. 17 is a further schematic representation of part of a switch chassis.

FIG. 16 is a schematic representation of an example of two chassis management controllers 18 plugged into one side of a power distribution board 22 and 16 power supply units 16 plugged into the other side of the power distribution board 22. In the present example, the chassis management controllers 18 are plugged into the front side of the power distribution board 22 and the power supply units 16 are plugged into the rear side of the power distribution board 22 as mounted in the switch chassis. FIG. 17 illustrates bus bars 24 for a 3.3V standby supply.

In the present example the midplane 30 is a passive printed circuit board that has dimensions of 1066.8 mm (42")×908.05 mm (35.75")×7.1 mm (0.280"). The active area is 40"×34". 864 8×8 midplane connectors (432 midplane connectors per side) are provided. There is a ribbon cable connection the power distribution board 22 and a 3.3V standby copper bar to the power distribution board 22.

In the present example a fabric card 12 comprises a printed circuit board with dimensions of 254 mm (10")×1016 mm (40")×4.5 mm (177"). It comprises 24 8×8 fabric card connectors 46, one power connector 39, 8 fan module connectors and 8 switch chips 44.

In the present example a line card 14 comprises a printed circuit board with dimensions of 317.5 mm (12.5")×965.2 mm (38")×4.5 mm (177"). It comprises 24 stacked cable 168-circuit connectors 42, 18 8×8 card connectors 40, 1 busbar connector and 24 switch chips 35.

In the present example a power distribution board 22 comprises a printed circuit board, 16 power supply DC connectors, 14 6×6 card connectors (7 connectors per chassis management card 18, ribbon cable connectors for low-speed connectivity to the midplane 30, and a 3.3V standby copper bar to the midplane 30.

In the present example a chassis management card 18 comprises 14 6×6 card connectors (7 connectors per chassis management card), two RJ45 connectors for Ethernet available on a chassis management card panel, two RJ45 connectors for serial available at the chassis management card panel, three RJ45 for line card/fabric card debug console access at the chassis management card panel, three HEX rotary switches used to select between which line card/fabric card debug console is connected to the three RJ45s above, and a 220-pin connector for the mezzanine.

In the present example a mezzanine has dimensions: 92.0 mm×50.8 mm and comprises 4 mounting holes screw with either 5 mm or 8 mm standoff from the chassis management card board, a 220-pin connector for connectivity to chassis management board.

Figure 18:
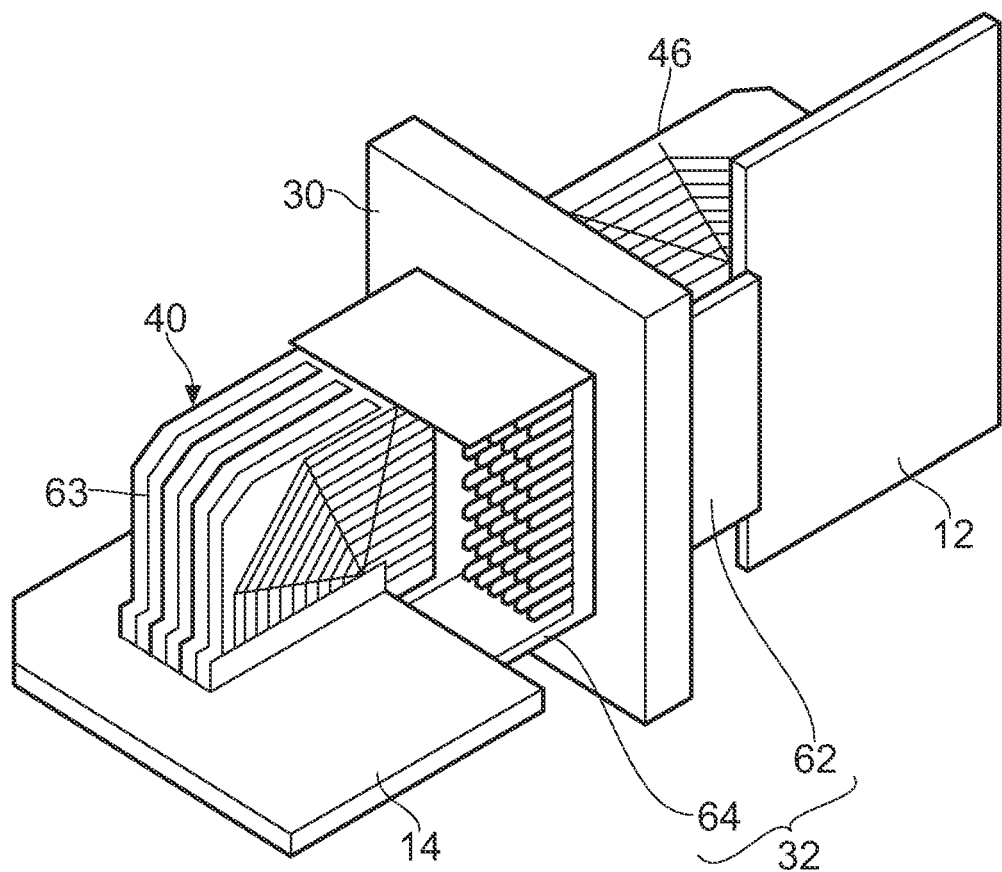
FIG. 18 is a schematic representation of the connections of two cards orthogonally with respect to each other.

FIG. 18 is a schematic isometric view of an example of a midplane connector pair 32. As can be seen in FIG. 18, the connector comprises a first, fabric side, connector 62 and a second, line card side, connector 64. In this example, each of the connector 62 and 64 is substantially U-shaped and comprises an 8×8 array of contact pins.

It will be noted that the second connector 64 of the midplane connector pair 32 is rotated through substantially 90 degrees with respect to the first connector 62. The first connector 62 is configured to connect to a corresponding fabric card connector 46 of a fabric card 12. The second connector 62 is configured to connect to a corresponding fabric card connector 46 of a line card 14. Through the orientation of the second connector 64 of the midplane connector pair 32 substantially orthogonally to the orientation of the first connector 62, it can be seen that the line card 14 is mounted substantially orthogonally to the fabric card 12. In the present example the line card 14 is mounted substantially horizontally and the fabric card is mounted substantially vertically 12.

Each of the contact pins on the connector 62 is electrically connectable to a corresponding contact of the fabric card connector 46. Each of the contact pins on the connector 64 is electrically connectable to a corresponding contact of the line card connector 40. The connector pins of the respective connectors 62 and 64 are connected by means of pass-through vias in the midplane 30 as will now be described in more detail.

Figure 19:
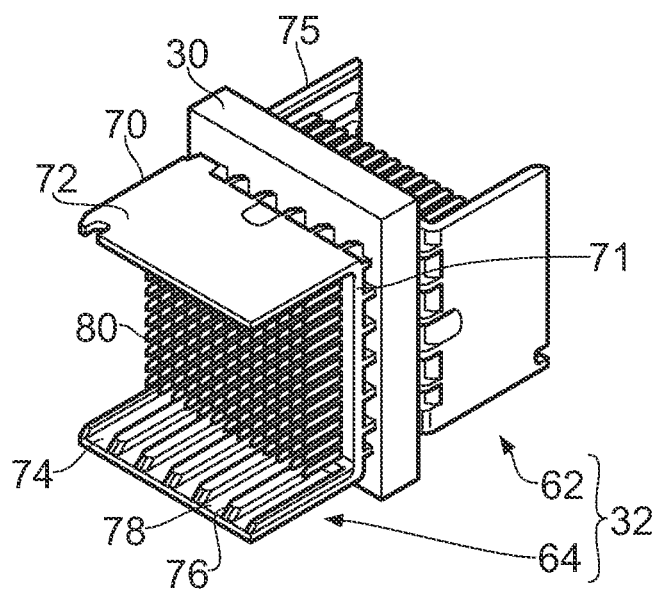
FIG. 19 is a schematic representation of an example of orthogonally arranged connectors.

FIG. 19 illustrates an example of the configuration of a first midplane connector 62 and a second midplane connector 64 of a midplane connector pair 32 in more detail. In the example shown in FIG. 19 that second connector 64 (the line card side connector) comprises a substantially U-shaped frame 70 including a substantially planar base 71 and first and second substantially planar walls 72 and 74 that extend at substantially at 90 degrees from the base 71. The inside edges of the first and second substantially planar sides 72 and 74 are provided with ridges 76 and grooves 78 that provide guides for the line card connector 40.

As can be seen in FIG. 18, the line card connector 40 has a structure that comprises a plurality of contact planes 63 that are aligned side by side, such that it has a generally planar construction that extends up from the line card 14. Line card connector planes comprise printed circuit boards carrying traces leading to contacts. The traces and contacts can be provided on both sides of the printed circuit boards of the line card connector planes.

By comparing FIGS. 18 and 19, it can be seen that each contact plane 63 of the line card connector 40 can be entered into a respective one of the grooves 78 so that connectors of the line card connector 40 can then engage with contact pins 80 of the second connector 64. In the case of the line card side connector portion 64, the orientation of second connector 64 and the grooves 78 therein means that the line card 12 is supported in a substantially horizontal orientation. In the example shown in FIG. 19, an 8×8 array of connector pins 80 is provided.

The first midplane connector 62 (fabric card side connector) of the midplane connector pair 32 has substantially the same form as the second midplane connector 62 of the midplane connector pair 32, except that it is oriented at substantially 90 degrees to the second midplane connector 64. In this example the second midplane connector 62 comprises a substantially U-shaped support frame 75 including a substantially planar base and first and second substantially walls and that extend at substantially at 90 degrees from the base. The inside edges of the first and second substantially planar sides are provided with ridges and grooves that provide guides for the fabric card connector 46. The fabric card connector 46 has the same basic structure as that of the line card connector 40 in the present instance. Thus, in the same way as for the line card connector, each of a plurality of contact planes of the fabric card connector 46 can be entered into a respective one of the grooves so that connectors of the fabric card connector 46 can then engage with contact pins of the first connector 62. The orientation of the first connector 62 and the grooves therein means that the fabric card 12 is supported in a substantially vertical orientation.

In the example illustrated in FIG. 19, the orthogonal connector 60 provides an 8×8 array of connector pins 80 is provided that can support supports 64 differential pairs or 32 bi-directional serial channels (two wires per direction) in a footprint of 32.2×32.2 mm.

As mentioned above, the contact pins of the first and second midplane connectors 62 and 64 of a midplane connector pair 32 are connected by means of pass through vias in the midplane.

Figure 20:
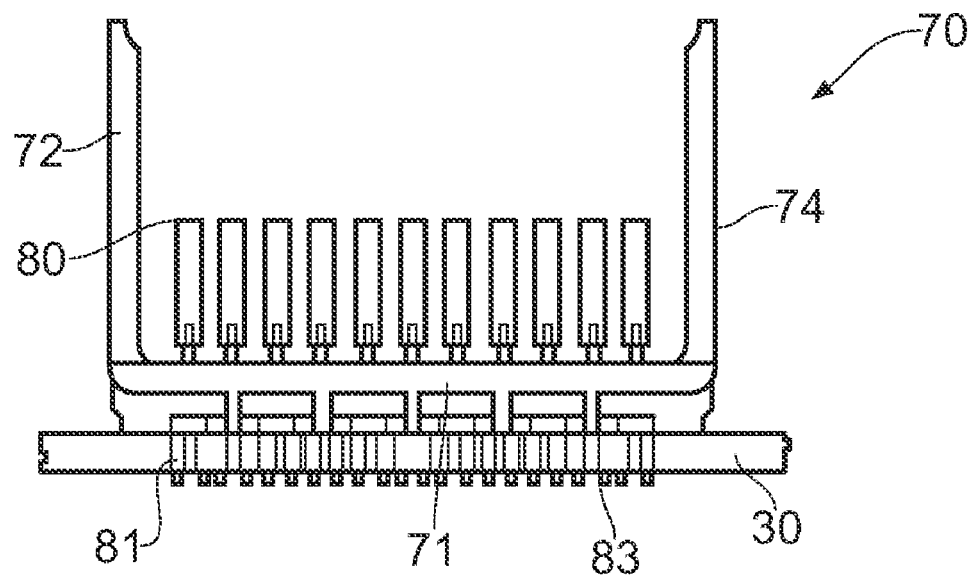
FIG. 20 is a schematic side view of one of the connectors of FIG. 19.

FIG. 20 illustrates a side view of an example of a midplane connector, for example the midplane connector 62 mounted on the midplane. In the example shown in FIG. 20 the midplane connector 64 comprises a substantially U-shaped frame 70 including a substantially planar base 71 and first and second substantially planar walls 72 and 74 that extend at substantially at 90 degrees from the base 71. The contact pins 80 are each connected to pairs of contact tails 81 that are arranged in sprung pairs that are arranged to be push fitted into pass through vias 83 in the midplane 30.

In use, the other midplane connector (e.g., the first midplane 62) of the midplane connector pair would be inserted into the pass through vias in the other side of the midplane 30 in the orthogonal orientation as discussed previously.

Figure 21:
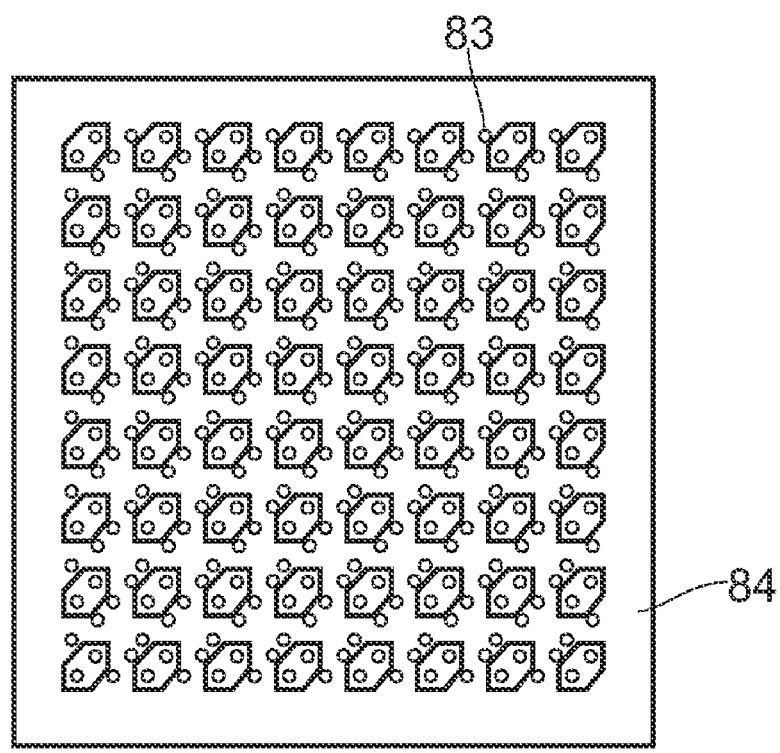
FIG. 21 is a plan view of an example configuration of vias for the orthogonal connector pairing of FIG. 19.
Figure 22:
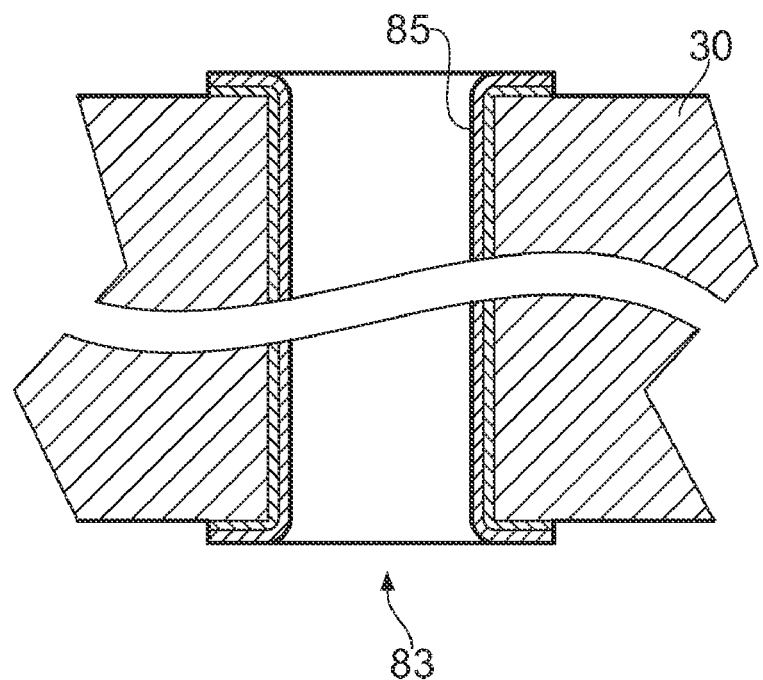
FIG. 22 is a cross-section through of a via.

FIG. 21 is a schematic representation of an area of the midplane for receiving the midplane connectors 62 and 64 of the midplane connector pair 32. This shows the array of vias 83. FIG. 22 is a schematic cross-section though such a via 83 in the showing the conductive wall 85 of the via 83. The conductive wall 85 can be formed by metal plating the wall of the via, for example.

Figure 23:
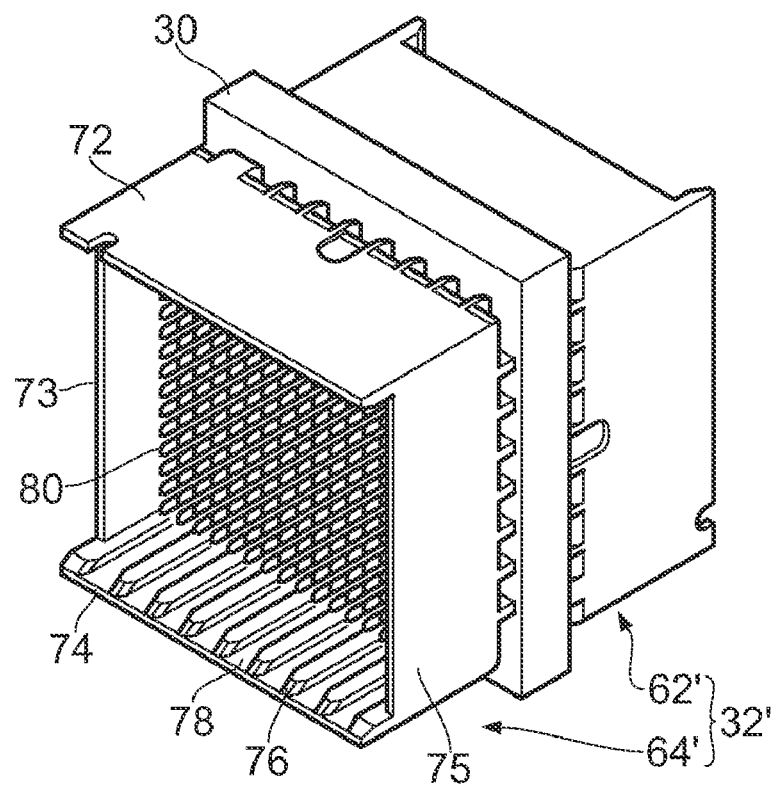
FIG. 23 is a schematic side view of example of an alternative to the connector of FIGS. 24 and 25 illustrate the assembly of an example of a switch card mounted portion of an example injection/ejection mechanism.

The examples of the midplane connectors described with reference to FIGS. 18 and 20 had a generally U-shape. However, other configurations for the midplane connectors are possible. For example FIG. 23 illustrates another example of a midplane connector pair 32', where the first and second midplane connectors 62' and 64' are generally the same as the first and second midplane connectors 62 and 64 described with reference to FIG. 19 except that, in addition to the first and second walls 72 and 74, third and fourth walls 73 and 75 are provided. The additional walls provide a generally box-shaped configuration that can facilitate the insertion and support for the cards to be connected thereto.

It will be appreciated that in other embodiments the first and second midplane connectors could have different shapes and/or configurations appropriate for the connections for the cards to be connected thereto.

The array of midplane connector pairs 32 as described above provides outstanding performance in excess of 10 Gbps over a conventional FR4 midplane because the orthogonal connector arrangements allow signals to pass directly from the line card to the fabric card without requiring any signal traces on the midplane itself. The orthogonal arrangements of the cards that can result from the use of the array of orthogonally arranged connector pairs also avoids the problem of needing to route a large number of signals on the midplane to interconnect line and fabric cards, minimizing the number of layers required. This provides a major simplification compared to existing fabric switches. Thus, by providing an array of such orthogonal connectors, each of a set of horizontally arranged line cards 12 can be connected to each of a set of vertically aligned fabric cards without needing intermediate wiring.

It will be appreciated from the above description that the injection of a line card 14, in particular, requires a large number of electrical and mechanical connections to be made between respective connector elements. As a result, a considerable injection force needs to be exerted in order to achieve the insertion, or injection of a line card 14. Similarly, the removal of a line card also required a considerable force to overcome the frictional resistance between respective connectors.

Accordingly, an aspect of an invention described herein relates to an injection/ejection mechanism for a line card for mounting and dismounting of the line card in, for example, a racking system.

In one example the insertion and extraction of a switch card onto a midplane can exhibit a high insertion force, for example of the order or more than 400 Kg of insertion force.

An example injection/ejection mechanism for mounting and dismounting of a unit in a chassis comprises a drive screw that cooperates with a threaded barrel. The threaded barrel can be rotatable for engagement and disengagement with at least one chassis component. The drive screw can be rotatable in a first rotational direction to urge the threaded barrel in a first longitudinal direction against at least one said chassis component for mounting of the unit. The drive screw can be rotatable in an opposite rotational direction to urge the threaded barrel in an opposite longitudinal direction against at least one said chassis component for dismounting of the unit.

Rotation of the drive screw in the first rotational direction can be operable to urge the threaded barrel in an outward direction against a said chassis component to draw in the unit with respect to the chassis and rotation of the drive screw in the second rotational direction is operable to urge the threaded barrel in an inward direction against a said chassis component to push out the unit with respect to the chassis.

A first said chassis component can be a first wall and a second said chassis unit can be a second wall. Rotation of the drive screw in the first rotational direction can be operable to urge the threaded barrel against the first wall to draw in the unit with respect to the chassis. Rotation of the drive screw in the second rotational direction can be operable to urge the threaded barrel against the second wall to push out the unit with respect to the chassis.

The first wall can be provided with a key-shaped hole configured to receive the threaded barrel in a first orientation of the threaded barrel, and to cause the threaded barrel to engage the first wall in a second orientation after rotation of the threaded barrel.

A lever can be coupled to the threaded barrel to cause rotation of the threaded barrel.

A guide can be arranged to cause rotational movement of the threaded barrel on rotational movement of the lever and to cause linear movement of the threaded barrel with respect to the level on rotation of the drive screw.

The guide can comprise at least one guide member configured to rotate with the lever and to be slideably mounted with respect to the threaded barrel, whereby rotation of the lever causes the threaded barrel to rotate with the lever and the guide, and rotation of the drive screw causes the threaded barrel to slide along the guide.

Alternatively, the guide can comprise at least one guide member configured to rotate with the threaded barrel and to be slideably mounted with respect to the lever, whereby rotation of the lever causes the threaded barrel to rotate with the lever and the guide, and rotation of the drive screw causes the guide to slide with respect to the lever.

A field replaceable unit, for example a line card unit can be provided with one, two or more injection/ejection mechanisms as described above. A chassis, for example a switch chassis, can provide one or more filed replaceable unit locations, e.g., line card unit locations, the locations including chassis components for engaging with the injection/ejection mechanisms.

An example embodiment of this aspect of an invention can facilitate insertion and extraction of a switch card onto a midplane that exhibits a high insertion force, for example in excess of 400 Kg of insertion force. The example mechanism is composed of several components that primarily reside on a switch card 600. Each switch card can have two inject/eject mechanisms (left and right). The receiver (chassis components) of the mechanism is (are) attached to and/or form part of the chassis.

Figure 25:
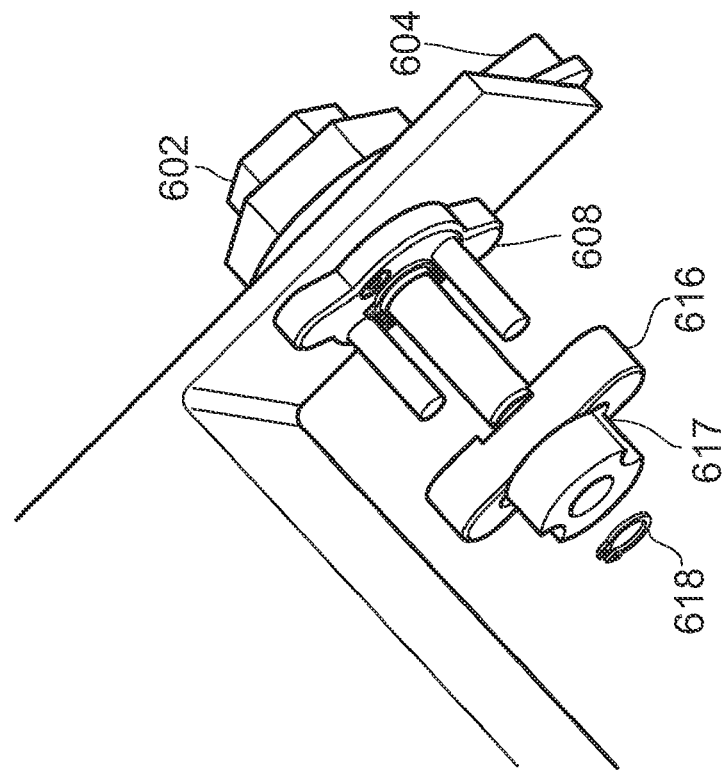
Figure 24:
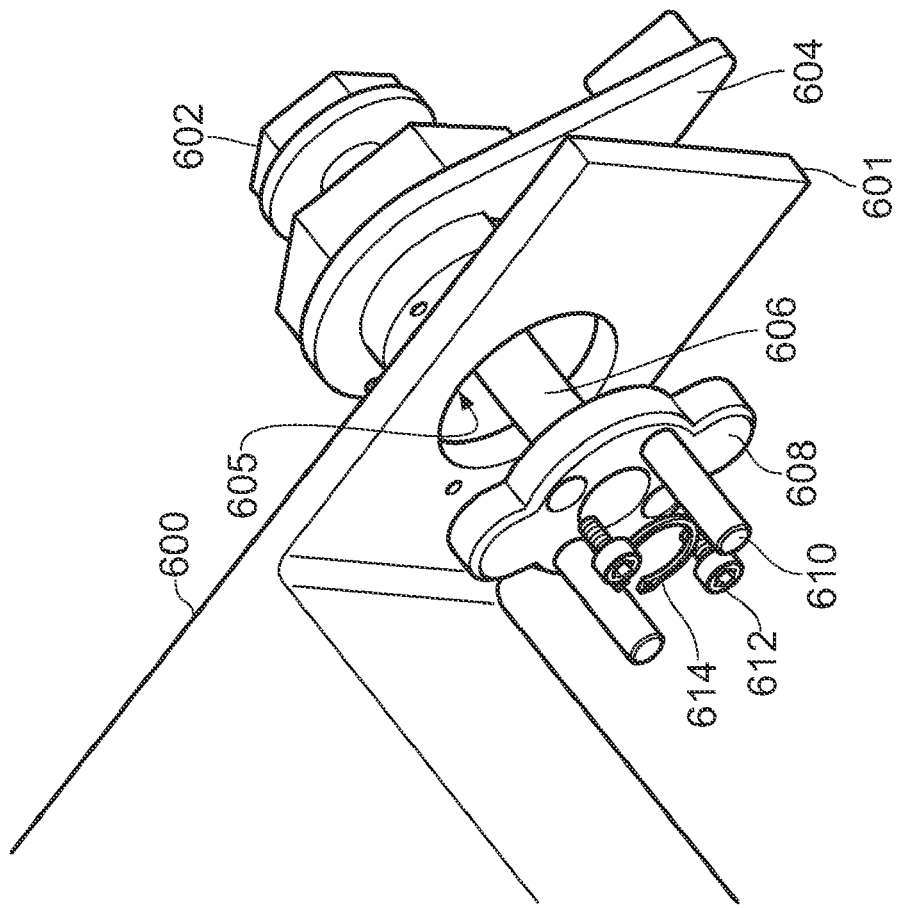
Figure 27:
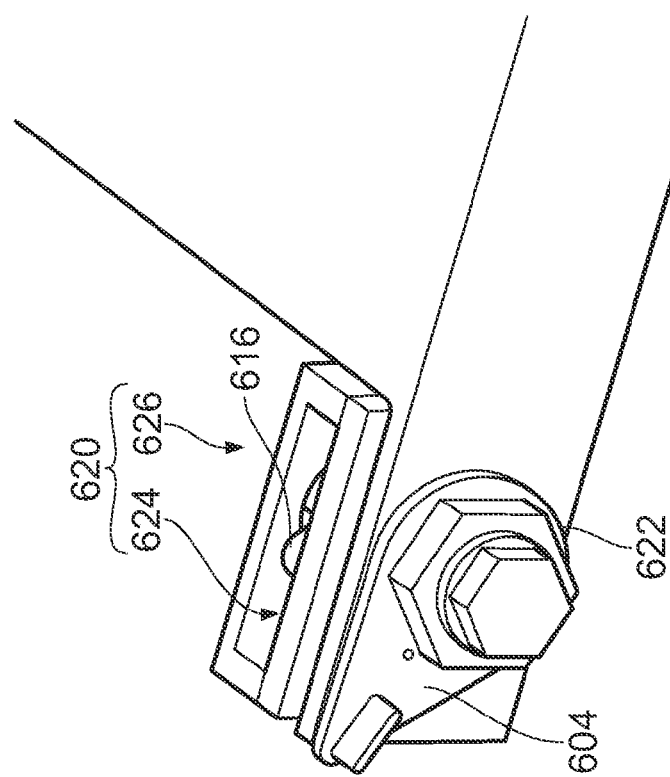
FIGS. 26-29 illustrate an example of insertion and ejection of a card by operation of the injection/ejection mechanism illustrated in FIGS. 24 and 25.
Figure 26:
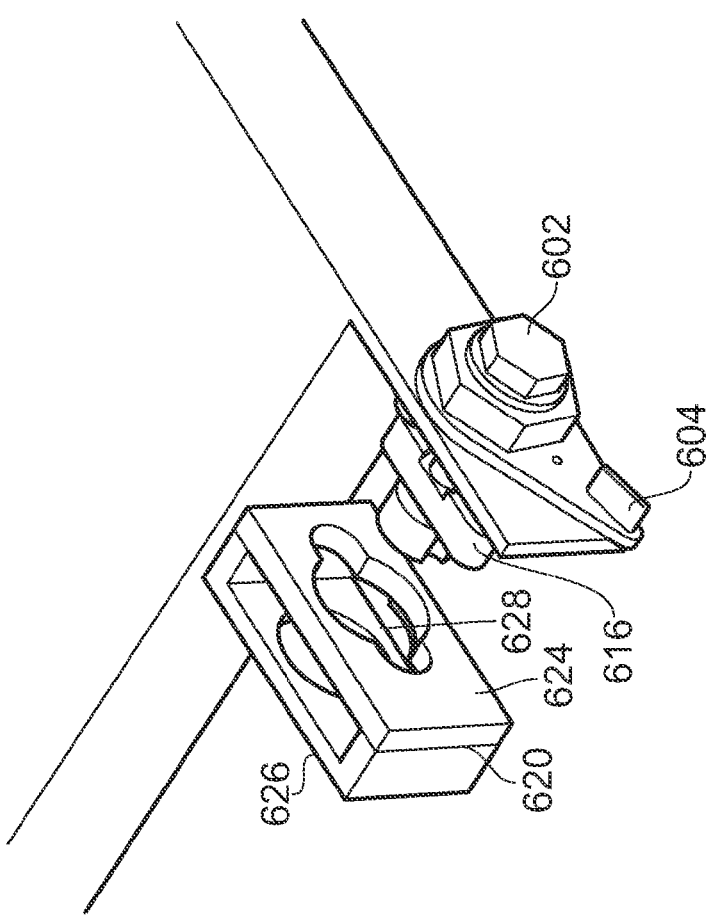
Figure 29:
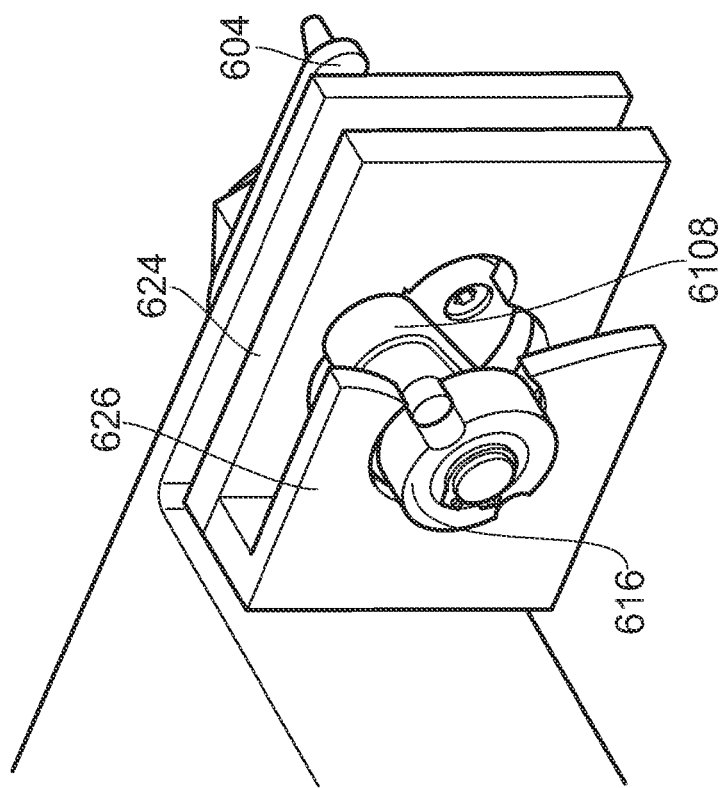
Figure 28:
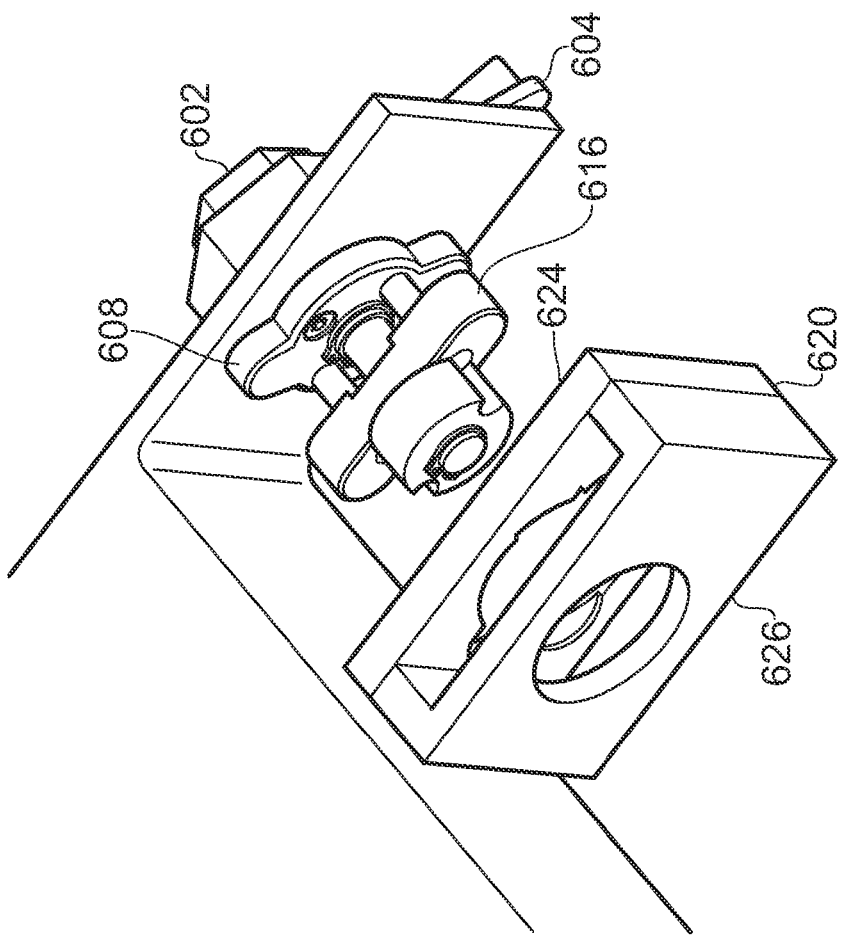

FIGS. 24 and 25 illustrate the assembly of an example of a switch card mounted portion of an example injection/ejection mechanism. This includes a drive screw 602 that passes through a hole 605 in a flange 601 of the line card 600. An engagement lever has a boss that also passes though the hole 605 in the flange 601. A threaded shaft 606 of the drive screw 602 passes through a plane hole in the engagement level 604. A retainer/guide member 608 is attached to the engagement lever 604 by means of screws 612, so that the retainer/guide rotates with the engagement lever 604. The drive screw is held in place by a circlip 614. The retainer/guide member 608 is also provided with first and second guides 610 that pass though guide holes 617 in a threaded barrel 616. Rotation of the drive screw 602 causes the threaded barrel 616 to move along the threaded shaft 606 of the drive screw. A circlip 618 can then be provided to delimit the movement of the threaded barrel 616 on the threaded shaft 606, once assembled The various components of the injection/ejection mechanism can be formed of appropriate material, for example of one or more metals such as steel, brass or aluminum, and/or plastics material shaving suitable mechanical properties.

The process of insertion and extraction of a switch card 600 is described in below with reference to FIGS. 26-29. As shown in FIGS. 26-29, insertion and ejection of the card is performed by operation of the components illustrated in FIGS. 24 and 25 in combination with the provision of the stationary chassis components 620 that are shown in FIGS. 26-29.

The stationary chassis components 620 include an outermost wall 624 with a key-shaped hole configured to receive the threaded barrel 616 in one orientation thereof, and to cause the threaded barrel to engage on the innermost side of the outermost wall 624 in a second orientation thereof. An innermost wall 626 of the stationary chassis components has a hole for receiving the boss at the centre of the threaded barrel and is located in a fixed relation with respect to the outermost wall 624 and taking into account of the thickness of the threaded barrel 616 such that that the threaded barrel will act on the innermost side of the outermost wall 624 during insertion of a switch card and on the outermost side of the innermost wall during ejection of the switch card.

The stationary chassis components 620/624, 626 can be made, for example, of a metal (e.g., steel, brass or aluminum) and can be formed integrally with a frame ember of a rack system (e.g., a vertical or horizontal member thereof). Alternatively, then can be formed as separate components that are attached to other components of the racking system at an appropriate location, for example using fastenings such as screws, bolts etc, or by being bonded or welded thereto. Also, they can be made of a material other than a metal, for example of a plastics material having sufficient mechanical strength.

The steps employed in an example of the insertion of a line card are as follows:

1. The engagement lever 604 is oriented in the open position shown in FIGS. 26 and 28 and on both inject/eject mechanisms (left and right side of the switch card).

2. Upon seating the mechanisms/switch card, both engagement levers will be rotated 45 degrees to the locked position shown in FIGS. 27 and 29. An audible click from a detent plunger 622 can indicate correct positioning along with visual indication from labeling.

3. The drive screw 602 can be rotated clockwise with a standard ratchet with properly sized socket at a predetermined angular definition. The user will alternate rotation of the drive screw between the left and right mechanism until the card is fully seated. Rotation of the drive screw clockwise causes the retainer guide member 608 to draw the switch card inwards by pressing against the innermost side of the outermost wall 624 of the stationary chassis components 620. The mechanism will not enable over insertion of the switch card due to a built in hard stop within the mechanism.

The steps employed for an example of the extraction of a line card are as follows:

1. The extraction starts from the locked position shown in FIGS. 27 and 29. The extraction of the switch card entails a counterclockwise rotation of the drive screws 602. The rotation will alternate between the left and right side mechanisms. Rotation of the drive screw anticlockwise causes the retainer guide member 608 to draw the switch card outwards by pressing against the outermost side of the innermost wall 626 of the stationary chassis components 620. Upon complete extraction, the drive screw will not allow continuing rotation due to a built in hard stop within the mechanism.

2. Upon releasing the switch card, both engagement levers 604 can be rotated 45 degrees to the open position shown in FIGS. 26 and 28. An audible click from a detent plunger can indicate correct position along with visual indication from labeling.

It will be appreciated that the injection/ejection mechanism can find application for the injection and ejection of components other than line card components and in applications other than a switch chassis. For example, in the present switch system, the injection/ejection mechanism could be used for the insertion and ejection of the line cards 12 and the fabric cards 12 (as shown in FIGS. 14 and 15, respectively), and of the power supplies 16, and so on.

There as been described an injection/ejection mechanism for mounting and dismounting of a unit in a chassis. The mechanism can include a drive screw that cooperates with a threaded barrel, the threaded barrel being rotatable for engagement and disengagement with at least one chassis component. The drive screw can be rotated in a first rotational direction to urge the threaded barrel in a first longitudinal direction against at least one chassis component for mounting of the unit and can be rotated in an opposite rotational direction to urge the threaded barrel in an opposite longitudinal direction against at least one chassis component for dismounting of the unit.

A chassis can include at least one location for receiving a field replaceable unit that comprises at least one such injection/ejection mechanism for mounting and dismounting of the unit in the chassis. Each said location can include at least one chassis component for interacting with the injection/ejection mechanism.

Although the embodiments above have been described in considerable detail, numerous variations and modifications will become apparent to those skilled in the art once the above disclosure is fully appreciated.

What is claimed is:

1. An injection/ejection mechanism for mounting and dismounting of a unit to a chassis, the mechanism comprising a unit having a drive screw that cooperates with a threaded barrel, the threaded barrel being rotatable for engagement and disengagement with at least one component of a chassis and the drive screw being rotatable in a first rotational direction to urge the threaded barrel in a first longitudinal direction against the at least one component of the chassis for mounting of the unit and being rotatable in an opposite rotational direction to urge the threaded barrel in an opposite longitudinal direction against the at least one component of the chassis for dismounting of the unit;
   wherein the unit includes a set of connectors that connect to corresponding connectors that are coupled to the chassis;
   wherein rotation of the drive screw in the first rotational direction is operable to urge the threaded barrel in an outward direction against the at least one component of the chassis to draw in the unit with respect to the chassis, causing the connectors for the unit to connect to the corresponding connectors that are coupled to the chassis.

2. The mechanism of claim 1, wherein rotation of the drive screw in the opposite rotational direction is operable to urge the threaded barrel in an inward direction against the at least one component of the chassis to push out the unit with respect to the chassis, causing the connectors for the unit to disconnect from the corresponding connectors that are coupled to the chassis.

3. The mechanism of claim 1, wherein a first said component of the chassis is a first wall and a second said component of the chassis is a second wall, rotation of the drive screw in the first rotational direction being operable to urge the threaded barrel against the first wall to draw in the unit with respect to the chassis and rotation of the drive screw in the opposite rotational direction is operable to urge the threaded barrel against the second wall to push out the unit with respect to the chassis.

4. The mechanism of claim 3, wherein the first wall is provided with a key-shaped hole configured to receive the threaded barrel in a first orientation of the threaded barrel, and to cause the threaded barrel to engage the first wall in a second orientation after rotation of the threaded barrel.

5. The mechanism of claim 1, comprising a lever coupled to the threaded barrel to cause rotation thereof of the threaded barrel.

6. The mechanism of claim 5, comprising a guide arranged to cause rotational movement of the threaded barrel on rotational movement of the lever and to cause linear movement of the threaded barrel with respect to the level on rotation of the drive screw.

7. The mechanism of claim 6, wherein the guide comprises at least one guide member configured to rotate with the lever and slideably mounted with respect to the threaded barrel, rotation of the lever being operable to cause the threaded barrel to rotate with the lever and the guide, and rotation of the drive screw being operable to cause the threaded barrel to slide along the guide.

8. The mechanism of claim 6, wherein the guide comprises at least one guide member configured to rotate with the threaded barrel and slideably mounted with respect to the lever, rotation of the lever being operable to cause the threaded barrel to rotate with the lever and the guide, and rotation of the drive screw being operable to cause the guide to slide with respect to the lever.

9. A field replaceable unit comprising at least one injection/ejection mechanism for mounting and dismounting of the unit in a chassis, the at least one mechanism comprising a drive screw that cooperates with a threaded barrel, the threaded barrel being rotatable for engagement and disengagement with at least one chassis component of a chassis and the drive screw being rotatable in a first rotational direction to urge the threaded barrel in a first longitudinal direction against the at least one component of the chassis for mounting of the unit and being rotatable in an opposite rotational direction to urge the threaded barrel in an opposite longitudinal direction against the at least one component of the chassis for dismounting of the unit;

wherein the unit includes a set of connectors that connect to corresponding connectors that are coupled to the chassis;

wherein rotation of the drive screw in the first rotational direction is operable to urge the threaded barrel in an outward direction against the at least one component of the chassis to draw in the unit with respect to the chassis, causing the connectors for the unit to connect to the corresponding connectors that are coupled to the chassis.

10. The field replaceable unit of claim 9, wherein the at least one injection/ejection mechanism includes a first mechanism and a second mechanism, the first mechanism being operable to cooperate with a chassis component at a first side of a chassis and the second mechanism being operable to cooperate with a chassis component at a second side of a chassis.

11. A chassis comprising at least one location for receiving a field replaceable unit that comprises at least one injection/ejection mechanism for mounting and dismounting of the unit in the chassis, wherein the at least one mechanism comprises a drive screw that cooperates with a threaded barrel, the threaded barrel being rotatable for engagement and disengagement with at least one component of the chassis and the drive screw being rotatable in a first rotational direction to urge the threaded barrel in a first longitudinal direction against the at least one component of the chassis for mounting of the unit and being rotatable in an opposite rotational direction to urge the threaded barrel in an opposite longitudinal direction against the at least one component of the chassis for dismounting of the unit, wherein the at least one location includes the at least one component of the chassis;

wherein the unit includes a set of connectors that connect to corresponding connectors that are coupled to the chassis;

wherein rotation of the drive screw in the first rotational direction is operable to urge the threaded barrel in an outward direction against the at least one component of the chassis to draw in the unit with respect to the chassis, causing the connectors for the unit to connect to the corresponding connectors that are coupled to the chassis.

12. The chassis of claim 11, wherein a first component of the chassis is a first wall and a second component of the chassis is a second wall, rotation of the drive screw in the first rotational direction being operable to urge the threaded barrel against the first wall to draw in the unit with respect to the chassis and rotation of the drive screw in the opposite rotational direction is operable to urge the threaded barrel against the second wall to push out the unit with respect to the chassis.

13. The chassis of claim 12, wherein the first wall is provided with a key-shaped hole configured to receive the threaded barrel in a first orientation of the threaded barrel, and to cause the threaded barrel to engage the first wall in a second orientation after rotation of the threaded barrel.

14. The chassis of claim 11, wherein the at least one location comprises a first said chassis component at a first side of the chassis and a second said chassis component at a second side of the chassis.

15. The chassis of claim 11, wherein said at least one location comprises a field replaceable unit received therein.

16. The mechanism of claim 1, wherein the set of connectors for the unit includes electrical connectors.

17. The mechanism of claim 1, wherein prior to rotating the drive screw to mount the unit, the connectors for the unit are not connected to the corresponding connectors that are coupled to chassis.

* * * * *